United States Patent
Millius et al.

(10) Patent No.: US 10,642,830 B2
(45) Date of Patent: May 5, 2020

(54) CONTEXT AWARE CHAT HISTORY ASSISTANCE USING MACHINE-LEARNED MODELS

(71) Applicant: Google LLC, Mountain View, CA (US)

(72) Inventors: Sebastian Millius, Zurich (CH); Sandro Feuz, Zurich (CH)

(73) Assignee: Google LLC, Mountain View, CA (US)

( * ) Notice: Subject to any disclaimer, the term of this patent is extended or adjusted under 35 U.S.C. 154(b) by 245 days.

(21) Appl. No.: 15/758,363

(22) PCT Filed: Jun. 12, 2017

(86) PCT No.: PCT/US2017/036967
§ 371 (c)(1),
(2) Date: Mar. 8, 2018

(87) PCT Pub. No.: WO2018/231187
PCT Pub. Date: Dec. 20, 2018

(65) Prior Publication Data
US 2019/0034483 A1 Jan. 31, 2019

(51) Int. Cl.
*G06F 16/00* (2019.01)
*G06F 16/2453* (2019.01)
(Continued)

(52) U.S. Cl.
CPC ........ *G06F 16/2453* (2019.01); *G06F 16/335* (2019.01); *G06F 16/337* (2019.01);
(Continued)

(58) Field of Classification Search
CPC .................................................... G06F 16/337
See application file for complete search history.

(56) References Cited

U.S. PATENT DOCUMENTS

2004/0254998 A1 12/2004 Horvitz
2008/0305779 A1* 12/2008 Wright .................. H04W 4/029
455/414.1
(Continued)

OTHER PUBLICATIONS

International Search Report from PCT/US2017/036967 dated Jul. 19, 2017, 18 pages.
(Continued)

*Primary Examiner* — Ajith Jacob
(74) *Attorney, Agent, or Firm* — Dority & Manning, P.A.

(57) ABSTRACT

The present disclosure provides systems and methods that leverage machine learning to implement context determination and/or text extraction in computing device applications. Particular embodiments can include and use a machine-learned text extraction model that has been trained to receive one or more messages containing text and determine one or more portions of extracted text from the one or more messages as well as a corresponding user context assigned to each of the one or more portions of extracted text. In addition, or alternatively, particular embodiments can include and use a machine-learned context determination model that has been trained to receive one or more portions of device data from one or more input sources available at the mobile computing device and determine a current user context indicative of one or more activities in which a user of the mobile computing device is currently engaged.

26 Claims, 13 Drawing Sheets

(51) Int. Cl.
  *G06F 16/335* (2019.01)
  *G06F 16/387* (2019.01)
  *H04L 12/58* (2006.01)
  *G06N 3/04* (2006.01)
  *G06N 3/08* (2006.01)
  *G06N 20/00* (2019.01)

(52) U.S. Cl.
  CPC ......... *G06F 16/387* (2019.01); *G06N 3/0445* (2013.01); *G06N 3/084* (2013.01); *G06N 20/00* (2019.01); *H04L 51/22* (2013.01)

(56) References Cited

U.S. PATENT DOCUMENTS

| | | |
|---|---|---|
| 2013/0297551 A1 | 11/2013 | Smith et al. |
| 2015/0057035 A1 | 2/2015 | Somekh et al. |
| 2016/0357761 A1 | 12/2016 | Siracusa et al. |
| 2017/0147921 A1 | 5/2017 | Kasahara |

OTHER PUBLICATIONS

Goldberg, "A Primer on Neural Network Models for Natural Language Processing" Journal of Artificial Intelligence Research, vol. 57, Nov. 2, 2016, pp. 345-420.

\* cited by examiner

| | EXTRACTED ASSIGNED TEXT DATABASE | | | | 330 |
|---|---|---|---|---|---|
| Message ID: | Date: | Time: | Extracted Info: | Primary Context: | Secondary Context: |
| ABC306 | 5/04/2017 | 2:32pm | Bread | Shopping | Groceries |
| ABC306 | 5/04/2017 | 2:32pm | butter | Shopping | Groceries |
| ABC306 | 5/04/2017 | 2:32pm | 5/7/2017 | Shopping | Groceries |
| ABC310 | 5/04/2017 | 2:40pm | Baseball Game | Event | Sports |
| ABC312 | 5/04/2017 | 2:42pm | Knights Winning | Event | Sports |
| ABC318 | 5/05/2017 | 10:08am | Teacher Name: Audrey | Meeting | Parent-Teacher Conference Meeting |
| ABC318 | 5/05/2017 | 10:08am | Geography Test | Meeting | Parent-Teacher Conference Meeting |

(332 → ABC306, 334 → ABC306, 336 → ABC306, 338 → ABC310, 340 → ABC312, 342 → ABC318, 344 → ABC318)

Figure 8

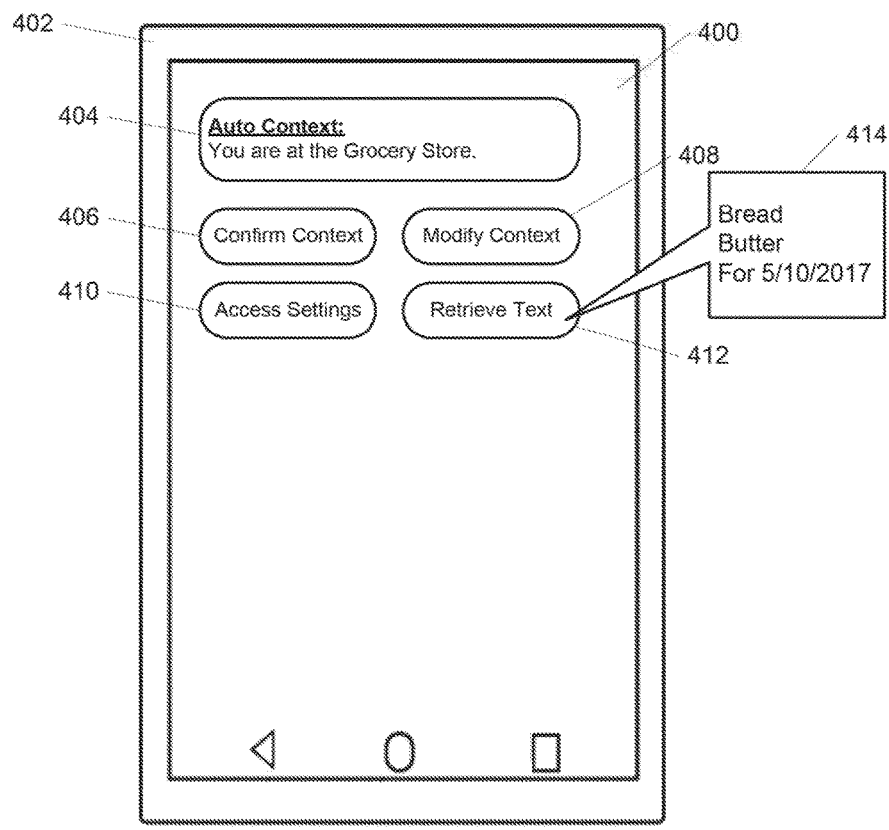

Figure 9

CONTEXT AWARE CHAT HISTORY ASSISTANCE USING MACHINE-LEARNED MODELS

FIELD

The present disclosure relates generally to machine learning. More particularly, the present disclosure relates to systems and methods for implementing context aware chat history assistance using machine-learned models.

BACKGROUND

Computing devices have numerous applications that convey text information or other data between different networked users. For example, text messaging or chat messaging applications convey text data among networked devices in an unstructured manner. Such text data may have identifiers including sender and/or recipient information as well as date and/or time stamps. However, such applications typically do not organize the text data in a manner that identifies relevant portions of text data based on the substance of the text data itself and/or different topics or categories to which the text data may be attributed. As such, solutions are needed that help to organize, categorize and convey portions of text data in a meaningful and useful way to computing device users.

Current solutions for identifying information of interest may involve manual searching through a large volume of text data or other data. This often involves a substantial amount of time spent by a user scrolling or otherwise searching through a long list of chat recipients and/or chat messages. Some chat messaging or text messaging applications include tools for implementing a keyword search through the text included in such applications. However, even keyword searching tools lack an ability to aggregate information from different messages and/or recipients in a meaningfully related manner. In particular, a need exists within such applications to identify related text and correlate it to particular events or activities.

SUMMARY

Aspects and advantages of embodiments of the present disclosure will be set forth in part in the following description, or can be learned from the description, or can be learned through practice of the embodiments.

One example aspect of the present disclosure is directed to a mobile computing device. The mobile computing device includes at least one processor, a display screen, a machine-learned context determination model, and at least one tangible, non-transitory computer-readable medium that stores instructions that, when executed by the at least one processor, cause the at least one processor to perform operations. The context determination model has been trained to receive one or more portions of device data from one or more input sources accessible by the mobile computing device and determine a current user context indicative of one or more activities in which a user of the mobile computing device is currently engaged. The operations performed by the mobile computing device include obtaining a first set of one or more portions of device data from one or more input sources accessible by the mobile computing device. The operations performed by the mobile computing device also include inputting the first set of one or more portions of device data into the machine-learned context determination model. The operations performed by the mobile computing device also include receiving, as an output of the machine-learned context determination model, a determined current user context. The operations performed by the mobile computing device also include determining one or more portions of text from one or more applications of the mobile computing device that have an assigned user context that matches the determined current user context. The operations performed by the mobile computing device also include providing the one or more portions of text for display on the display screen of the mobile computing device.

The determined user context may be determined from a predetermined set of user contexts, each user context indicative of a different activity in which a user of the mobile computing device may be engaged. The predetermined set of user contexts may comprise respective contexts for one or more different activities including shopping or attending an event. Each different activity associated with a user context in the predetermined set of user contexts may correspond to a primary context and wherein the user context is further determined to include a secondary context associated with a category describing a particular aspect of the activity. The mobile computing device may further comprise one or more input sources configured to provide the device data, the input sources comprising one or more of a location sensor, a motion sensor, an audio sensor, an image sensor, and a calendar application. Determining one or more portions of text from one or more applications of the mobile computing device that have an assigned user context that matches the determined user context may be determined periodically. The one or more applications of the user computing device may comprise one or more of a text messaging application, a chat messaging application, an email application, and a voicemail application. The one or more portions of text may be taken from a message thread between two or more parties. The operations may further comprise: receiving signal instructions from a user descriptive of feedback regarding the one or more portions of text provided for display on the display screen of the mobile computing device; and providing the signal instructions from the user in conjunction with data describing the one or more portions of text provided for display on the display screen as training data for the machine-learned context determination model. The step of determining the one or more portions of text from the one or more applications of the mobile computing device that have an assigned user context that matches the determined user context may comprise: inputting the text from the one or more applications into a machine-learned text extraction model, the machine-learned text extraction model having been trained to receive one or more messages containing text and to determine one or more portions of extracted text from the one or more messages and a corresponding user context assigned to each of the one or more portions of extracted text; and receiving, as an output of the machine-learned text extraction model, one or more portions of extracted text, wherein the user context assigned to each of the one or more portions of extracted text corresponds to the determined current user context.

Another example aspect of the present disclosure is directed to a mobile computing device that includes at least one processor, a machine-learned text extraction model, and at least one tangible, non-transitory computer-readable medium that stores instructions that, when executed by the at least one processor, cause the mobile computing device to perform operations. The text extraction model can have been trained to receive one or more messages containing text and determine one or more portions of extracted text from the one or more messages and a corresponding user context assigned to each of the one or more portions of extracted text. The operations performed by the mobile computing device include obtaining a first set of messages containing text from one or more applications of the mobile computing device. The operations performed by the mobile computing device also include inputting the first set of messages containing text into the machine-learned text extraction model. The operations performed by the mobile computing device also include receiving, as an output of the machine-learned text extraction model, one or more portions of extracted text from the first set of messages and a corresponding user context assigned to each of the one or more portions of extracted text. The operations performed by the mobile computing device also include providing at least one portion of extracted text assigned to at least one corresponding user context as output.

The operations may further comprise receiving signal instructions from a user indicative of a particular user context, and wherein providing at least one portion of extracted text assigned to at least one corresponding user context as output comprises providing at least one portion of extracted text assigned to the particular user context for display on a display screen of the mobile computing device. The operations may further comprise determining a current user context indicative of one or more activities in which a user of the mobile computing device is currently engaged, and wherein providing at least one portion of extracted text assigned to at least one corresponding user category as output comprises providing at least one portion of extracted text corresponding to the current user context for display on a display screen. Determining the current user context may comprise: obtaining a first set of one or more portions of device data from one or more input sources accessible by the mobile computing device; inputting the first set of one or more portions of device data into a machine-learned context determination model, wherein the context determination model has been trained to receive one or more portions of device data from the one or more input sources and determine a current user context indicative of one or more activities in which a user of the mobile computing device is currently engaged; and receiving, as an output of the machine-learned context determination model, a determined current user context. The current user context may be determined from a predetermined set of user contexts, each user context indicative of a different activity in which a user of the mobile computing device may be engaged, and optionally wherein the predetermined set of user contexts comprises respective contexts for one or more different activities including shopping or attending an event. Each different activity associated with a user context in the predetermined set of user contexts may correspond to a primary context and wherein the user context is further determined to include a secondary context associated with a category describing a particular aspect of the activity. The device may further comprise one or more input sources configured to provide device data, the input sources comprising one or more of a location sensor, a motion sensor, an audio sensor, an image sensor, and a calendar application, and wherein the device data is employed at least in part to determine the current user context. The obtaining, inputting and receiving operations may be implemented periodically. The one or more applications of the user computing device may comprise one or more of a text messaging application, a chat messaging application, an email application, and a voicemail application. The operations may further comprise: receiving signal instructions from a user descriptive of feedback regarding the at least one portion of extracted text provided as output; and providing the signal instructions from the user in conjunction with data describing the at least one portion of text provided as output as training data for the machine-learned text extraction model.

Another example aspect of the present disclosure is directed to one or more tangible, non-transitory computer-readable media storing computer-readable instructions that when executed by one or more processors cause the one or more processors to perform operations. The operations include obtaining a first set of messages containing text from one or more applications of a mobile computing device. The operations also include inputting the first set of messages containing text into a machine-learned text extraction model, wherein the text extraction model can have been trained to receive one or more messages containing text and determine one or more portions of extracted text from the one or more messages and a corresponding user context assigned to each of the one or more portions of extracted text. The operations also include receiving, as an output of the machine-learned text extraction model, one or more portions of extracted text from the first set of messages and a corresponding user context assigned to each of the one or more portions of extracted text. The operations also include providing at least one portion of extracted text assigned to at least one corresponding user context as output.

Providing at least one portion of extracted text assigned to the at least one corresponding user context as output may comprise providing the at least one portion of extracted text for display. The instructions may further comprise: receiving signal instructions descriptive of feedback regarding the at least one portion of extracted text provided as output; and providing the signal instructions from the user in conjunction with data describing the at least one portion of extracted text provided as output as training data for the machine-learned text extraction model.

Another example aspect of the present disclosure is directed to one or more tangible, non-transitory computer-readable media storing computer-readable instructions that when executed by one or more processors cause the one or more processors to perform operations. The operations include obtaining a first set of one or more portions of device data from one or more input sources accessible by a mobile computing device. The operations also include inputting the first set of one or more portions of device data into a machine-learned context determination model, wherein the context determination model can have been trained to receive one or more portions of device data from the one or more input sources and determine a current user context indicative of one or more activities in which a user of the mobile computing device is currently engaged. The operations also include receiving, as an output of the machine-learned context determination model, a determined current user context. The operations also include determining one or more portions of text from one or more applications of the mobile computing device that are relevant to the determined user context. The operations also include providing the one or more portions of text for display on a display screen of the mobile computing device.

Determining one or more portions of text from one or more applications of the mobile computing device that are relevant to the determined user context may comprise: inputting the text from the one or more applications into a machine-learned text extraction model, the machine-learned text extraction model being trained to receive one or more messages containing text and to determine one or more portions of extracted text from the one or more messages and a corresponding user context assigned to each of the one or more portions of extracted text; and receiving, as an output of the machine-learned text extraction model, one or more portions of extracted text, wherein the user context assigned to each of the one or more portions of extracted text corresponds to the determined current user context. The instructions may further comprise: receiving signal instructions descriptive of feedback regarding the one or more portions of text provided for display on the display screen of the mobile computing device; and providing the signal instructions from the user in conjunction with data describing the one or more portions of text provided for display on the display screen as training data for the machine-learned context determination model.

It will be appreciated that features described in the context of one aspect can be implemented in the context of other aspects set out above. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 8 depicts example database records for extracted assigned text according to example embodiments of the present disclosure;

FIG. 9 depicts an example user interface associated with determined user contexts according to example embodiments of the present disclosure;

DETAILED DESCRIPTION

Figure 1:
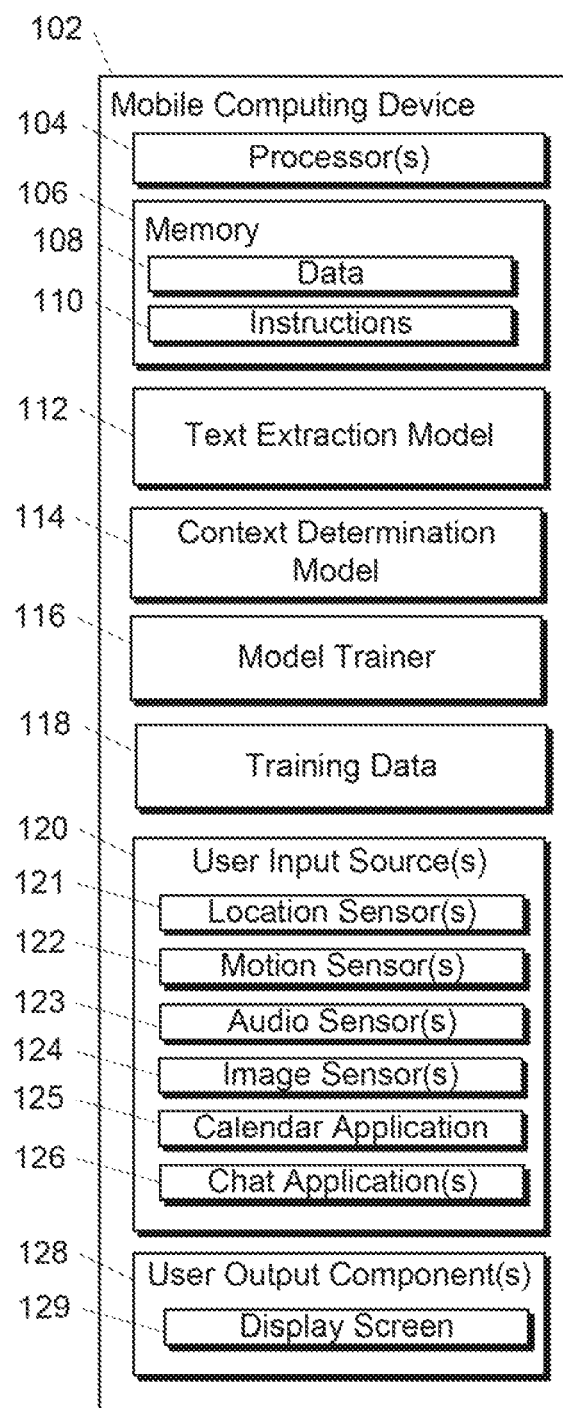
FIG. 1 depicts a block diagram of an example mobile computing device according to example embodiments of the present disclosure.

Generally, the present disclosure is directed to systems and methods that leverage machine learning to implement context determination and/or text extraction in computing device applications. In particular, the systems and methods of the present disclosure can include and use a machine-learned text extraction model that is trained to receive one or more messages containing text and determine one or more portions of extracted text from the one or more messages as well as a corresponding user context assigned to each of the one or more portions of extracted text. In addition, or alternatively, the systems and methods of the present disclosure can include and use a machine-learned context determination model that is trained to receive one or more portions of device data from one or more input sources available at the mobile computing device and determine a current user context indicative of one or more activities in which a user of the mobile computing device is currently engaged. The user contexts assigned by the text extraction model and/or the current user context determined by the context determination model can be determined from a predetermined set of different user contexts associated with various activities and corresponding categories (e.g., shopping, working out, attending a meeting, participating in a social gathering, etc.) The extracted text data assigned to a particular context can be provided to a user when the user is determined to be in the particular context. As such, users can be automatically notified or can more easily search to obtain relevant text or other data when operating a mobile computing device. For example, mobile devices (e.g., smartphones) or other computing devices that employ text-based applications (e.g., chat messaging applications) can provide integrated tools for summarizing text data and providing it to a user in a structured and automated manner.

In one example embodiment, consider an ongoing conversation between two users while the first user is operating a chat messaging application on her mobile computing device. The ongoing conversation includes messages discussing certain food items that they still need to purchase for an upcoming event. For example, the messages can include text such as "Hey S! We still need bread and butter for the brunch on Sunday." The conversation may not be continuously about that topic, and there may be intervening messages between the two users that are unrelated to the dinner party. However, the next time that either the first user or the second user is determined to be in a particular context (e.g., at a store or shopping online), they would want to access and/or be automatically provided with all of the relevant text data (e.g., bread, butter, May 7, 2017 (where May 7, 2017 is the Sunday referred to in the message)) or other information from their chat message history that is related to the particular context (e.g., shopping). For example, a mobile computing device can be configured to actively generate a notification with "Bread, Butter, May 7, 2017" that reminds the first user what to purchase when a mobile computing device detects that the first user has entered a shopping context.

In some implementations, a mobile computing device (e.g., a mobile computing device such as a smartphone or other mobile device) can include at least one processor and at least one tangible, non-transitory computer-readable medium that stores instructions that, when executed by the at least one processor, cause the mobile computing device to perform operations. The mobile computing device can also include a text extraction model. In some implementations, the text extraction model is a machine-learned text extraction model. For example, a machine-learned text extraction model can include one or more neural networks (e.g., deep neural networks), support vector machines, decision trees, ensemble models, k-nearest neighbors models, Bayesian networks, or other types of models including linear models and/or non-linear models. Example neural networks can include feed-forward neural networks, convolutional neural networks, recurrent neural networks (e.g., long short-term memory (LSTM) recurrent neural networks, gated recurrent unit (GRU) neural networks), or other forms of neural networks.

In some implementations, the mobile computing device can additionally or alternatively access a text extraction model that is stored in a remote location from the mobile computing device (e.g., at a remote server location hosting a text extraction application).

The mobile computing device can obtain a first set of messages containing text data from one or more computing device applications (e.g., one or more of a text messaging application, a chat messaging application, an email application, and/or a voicemail application). In some implementations, the text data can be obtained and further analyzed on a continuous basis such that text data is obtained in real time or near real time and analyzed upon being sent and/or received within a text-based application. In some implementations, the text data can be obtained and further analyzed on a periodic basis such as at regularly scheduled intervals (e.g., every five minutes). In some implementations, the text data can be obtained and further analyzed upon the occurrence of one or more triggering events (e.g., times when a particular text-based application is opened or employed on a mobile computing device, times when a new context is determined by the mobile computing device, etc.) A user of the mobile computing device can be provided with an opportunity to control whether and/or which messages and/or text data is accessible to a text extraction model and/or other components of the mobile computing device and related applications or models.

The mobile computing device can be further configured to provide the first set of messages containing text data as input into a machine-learned text extraction model. The mobile computing device can then receive, as an output of the text extraction model, one or more portions of extracted text from the first set of messages and a corresponding user context assigned to each of the one or more portions of extracted text.

In some implementations, the user context assigned to each of the one or more portions of extracted text can be determined from a predetermined set of different user contexts. Each user context can be indicative of a different activity in which a user of the mobile computing device may be engaged. As such, the predetermined set of user contexts can include respective contexts for one or more different activities including shopping or attending an event. In some implementations, the predetermined set of user contexts can include one or more primary contexts and one or more secondary contexts. For example, the one or more primary contexts could correspond to the different activities (e.g., shopping or attending an event), and the one or more secondary contexts could correspond to particular aspects of the different activities.

For instance, a secondary context could describe a category associated with the activity. One example user context could have a primary context of shopping and a secondary context associated with the categorical type of shopping (e.g., furniture shopping, grocery shopping, clothing shopping, etc.) Another example user context could have a primary context of attending an event with a secondary context associated with the categorical type of event (e.g., attending a work meeting, attending a social event with friends, attending a fitness class at the gym, etc.)

A mobile computing device can be further configured to provide at least one portion of extracted text assigned to at least one corresponding user context as output. In some implementations, such extracted text can be provided for display on a display screen of the mobile computing device. In some implementations, such extracted text can be stored in an extracted assigned text database. The extracted assigned text database can include, for example, a plurality of data records corresponding to the extracted text. Each data record can include, for example, a portion of extracted text, one or more identifiers associated with the extracted text (e.g., a message identifier, a date identifier, a time identifier, a sender identifier, one or more recipient identifiers), and one or more assigned contexts. Assigned user contexts can include multiple user contexts when available (e.g., a primary user context, secondary user context, tertiary user context, etc.) or other descriptors or categories associated with a user context.

In some implementations, a user can request information associated with a particular context. For instance, the computing device can receive signal instructions from a user indicative of a particular user context. In response to receipt of such signal instructions, at least one portion of extracted text assigned to the particular user context can be provided as output (e.g., by providing the at least one portion of extracted text for display on a display screen of the mobile computing device).

In some implementations, notifications including extracted assigned text data can be actively provided as output based on a determined current user context. For instance, a computing device can be configured to automatically determine a current user context indicative of one or more activities in which a user of the mobile computing device is currently engaged. At least one portion of extracted text assigned to the current user context using the text extraction model can then be provided as output (e.g., by providing the at least one portion of extracted text for display on a display screen of the mobile computing device).

In some implementations, a mobile computing device can further include a context determination model. In some implementations, the context determination model is a machine-learned context determination model. For example, a machine-learned context determination model can include one or more neural networks (e.g., deep neural networks), support vector machines, decision trees, ensemble models, k-nearest neighbors models, Bayesian networks, or other types of models including linear models and/or non-linear models. Example neural networks can include feed-forward neural networks, convolutional neural networks, recurrent neural networks (e.g., long short-term memory (LSTM) recurrent neural networks, gated recurrent unit (GRU) neural networks), or other forms of neural networks.

In some implementations, the mobile computing device can additionally or alternatively access a context determination model that is stored in a remote location from the mobile computing device (e.g., at a remote server location hosting a context determination application).

The mobile computing device can obtain a first set of one or more portions of device data from one or more input sources. A user of the mobile computing device can be provided with an opportunity to control whether and/or which device data is obtained and accessible to a context determination model and/or other components of the mobile computing device and related applications or models.

In some implementations, the one or more input sources can be available locally within the mobile computing device. In some implementations, the one or more input sources can be additionally or alternatively available via electronic devices of the user that are networked with the mobile computing device (e.g., input sources within a wearable computing device of the user that is in electronic communication with the mobile computing device).

Example input sources can include one or more sensors, for instance, one or more location sensors (e.g., a Global Positioning Sensor (GPS), wireless beacon, etc.), one or more motion sensors (e.g., an accelerometer, a magnetometer, gyroscope, compass, etc.), one or more audio sensors (e.g., a microphone), one or more image sensors (e.g., camera), or other sensors. Example input sources can also include one or more applications, for instance, calendar applications, mapping or other navigation applications, communication applications, document creation applications, and the like. As such, device data obtained from the one or more input sources can include sensor-based data and/or application-based data. Sensor-based data can include raw sensor data and/or can include generalization(s) and/or classification(s) of the raw sensor data. Similarly, application-based data can include raw application data and/or can include generalization(s) and/or classification(s) of the raw application data.

The mobile computing device can be further configured to provide the first set of one or more portions of device data as input to the machine-learned context determination model. The mobile computing device can then receive, as an output of the context determination model, a determined current user context. The current user context can be determined from a predetermined set of user contexts, for example, the same predetermined set of user contexts utilized by the text extraction model to which various portions of extracted text can be assigned.

The mobile computing device can be further configured to determine one or more portions of text from one or more applications of the mobile computing device that are relevant to the current user context determined by the context determination model. For example, in the event that the mobile computing device also includes a text extraction model as described herein, the computing device can be configured to access the extracted assigned text database employed by the text extraction model. Extracted text or other information stored in one or more records within the extracted assigned text database can be analyzed to determine records having an assigned user context that matches the current user context determined by the context determination model. In some examples, the records within the extracted text database can be additionally or alternatively analyzed to determine records having a date identifier and/or time identifier that is within a predetermined range. In one example, records can be identified having a recent date identifier and/or time identifier. In another example, records can be identified having a date identifier and/or time identifier that is associated with a particular user context (e.g., attending a regular fitness class at the gym). The one or more portions of text that are relevant to the current user context can be provided as output (e.g., by providing the at least one portion of extracted text for display on a display screen of the mobile computing device).

According to another aspect of the present disclosure, in some implementations, a text extraction model and/or a context determination model or at least a portion thereof is made available via an application programming interface (API) for one or more applications provided on a computing device. In some instances, a first application uses an API to request access to the text extraction model, context determination model and/or portion(s) thereof. The text extraction model, context determination model and/or portion(s) thereof can be hosted as part of a second application or in a dedicated layer, application, or component within the same computing device as the first application or in a separate computing device.

According to another aspect of the present disclosure, the text extraction model and/or context determination model described herein can be trained on ground-truth data using novel loss functions. More particularly, a training computing system can train the text extraction model and/or context determination model using a training dataset that includes a number of sets of ground-truth data.

In some implementations, when training the text extraction model to determine relevant messages, extracted text or other structured information, and assigned user contexts, a text extraction training dataset can include structured information (e.g., messages containing text data and the like) and corresponding labels that describe a large number of previously-observed messages.

In one implementation, the text extraction training dataset includes a first portion of data corresponding to recorded messages including text data relayed via a text-based application on a mobile computing device. The recorded messages can, for example, be recorded while a user is operating one or more text-based applications (e.g., a chat messaging, text messaging, or email application) on a mobile computing device and/or networked electronic device (e.g., a wearable computing device operated by the user). The text extraction training dataset can further include a second portion of data corresponding to labels identifying particular portions of text or other structured data (e.g., images, videos, etc.) that should be extracted as relevant. The second portion of data can additionally or alternatively include labels identifying the different user contexts assigned to the relevant portions of extracted text. In some instances, the messages including text data can be labeled automatically using conventional heuristics applied to interpret the text data. For example, heuristics can include rules or patterns that are configured to detect predetermined phrases such as "I need to buy", "can you bring", "meet you at", or the like. In some instances, the messages including text data can be labeled manually. In some instances, the text data can be labeled using a combination of automatic labeling and manual labeling.

In some implementations, to train the text extraction model, a training computing system can input a first portion of a set of ground-truth data (e.g., the first portion of the first example training dataset) into the text extraction model to be trained. In response to receipt of such first portion, the text extraction model outputs one or more portions of extracted text each with a corresponding assigned user context. This output of the text extraction model predicts the remainder of the set of ground-truth data (e.g., the second portion of data). After such prediction, the training computing system can apply or otherwise determine a loss function that compares the one or more portions of extracted text and corresponding assigned user context(s) output by the text extraction model to the remainder of the ground-truth data which the text extraction model attempted to predict. The training computing system then can backpropagate the loss function through the text extraction model to train the text extraction model (e.g., by modifying one or more weights associated with the text extraction model). This process of inputting ground-truth data, determining a loss function and backpropagating the loss function through the text extraction model can be repeated numerous times as part of training the text extraction model.

In some implementations, when training the context determination model to determine a current user context, a context determination training dataset can include device data from one or more input sources and corresponding labels that describe a large number of previously-observed instances of device data.

In one implementation, the context determination training dataset includes a first portion of data corresponding to device data from one or more input sources. The device data can include, for example, sensor-based data from one or more location sensors, motion sensors, audio sensors, image sensors and/or other sensors and/or application-based data from one or more calendar applications, mapping or navigation applications, communication applications, document creation applications, and/or other applications. The device data can, for example, be recorded while a user is operating a mobile computing device and/or networked electronic device (e.g., a wearable computing device operated by the user). The context determination training dataset can further include a second portion of data corresponding to labels identifying different activities in which a particular user participates over a period of time (e.g., multiple times throughout a day, multiple days throughout a week/month/etc.) In some instances, the labels included within the second portion of data within the context determination training dataset can be manually annotated by a user of a given mobile computing device while operating a training application on the mobile computing device designed to gather labels for including in the context determination training dataset. In some instances, the device data including user context labels can be labeled automatically or using a combination of automatic labeling and manual labeling.

In some implementations, to train the context determination model, a training computing system can input a first portion of a set of ground-truth data (e.g., the first portion of the second example training dataset) into the context determination model to be trained. In response to receipt of such first portion, the context determination model outputs a user context indicative of one or more activities in which a user of the mobile computing device is currently engaged. This output of the context determination model predicts the remainder of the set of ground-truth data (e.g., the second portion of the second example training dataset). After such prediction, the training computing system can apply or otherwise determine a loss function that compares the user context output by the context determination model to the remainder of the ground-truth data which the context determination model attempted to predict. The training computing system then can backpropagate the loss function through the context determination model to train the context determination model (e.g., by modifying one or more weights associated with the context determination model). This process of inputting ground-truth data, determining a loss function and backpropagating the loss function through the context determination model can be repeated numerous times as part of training the context determination model.

According to another aspect of the present disclosure, in some implementations, a user feedback system can be utilized to help gather additional training data for training the text extraction model and/or a context determination model. For instance, the mobile computing device can be configured to provide for display on a display screen associated with the mobile computing device one or more user interfaces that prompt a user to provide signal instructions descriptive of feedback regarding a determined user context and/or one or more portions of extracted text assigned to a determined user context. The signal instructions from the user can be provided along with data describing the determined user context and/or one or more portions of extracted text assigned to a determined user context as training data for one or more of the machine-learned text extraction model and the machine-learned context determination model.

In some instances, a user interface can be configured to display information descriptive of relevant extracted text for a particular user context either upon a user's request for information relevant to the particular user context or upon automatic determination (e.g., using the described context determination model) of current operation in a particular user context. User interaction with the user interface (e.g., by selecting one or more icons, buttons or other interface elements provided within the user interface) can initiate the relay of signal instructions descriptive of feedback regarding the extracted assigned text. For example, the feedback can indicate that the extracted assigned text was helpful or not helpful. Options can be provided to provide feedback for portions of extracted text or to provide a score for the level of helpfulness. This feedback can then be used to generate one or more labels for including with the corresponding text data. The labeled data can then be added to the text extraction training dataset.

In some instances, a user interface can be configured to display information descriptive of a determined user context. User interaction with the user interface (e.g., by selecting one or more icons, buttons or other interface elements provided within the user interface) can initiate the relay of signal instructions descriptive of feedback regarding the determined user context. For example, the feedback can confirm, reject and/or modify a determined user context. This feedback can then be used to generate a label for including with the corresponding device data used to determine a user context. The labeled data can then be added to the context determination training dataset.

The systems and methods described herein may provide a number of technical effects and benefits. For instance, the disclosed techniques can advantageously solve the time and resource problem associated with processing a large volume of text or other data within text-based computing device applications to organize, categorize and convey portions of text data in a meaningful and useful way to computing device users. The disclosed techniques provide automated solutions that can help to reduce time otherwise spent by a user to manually search through large volumes of data; for example, a user can be spared having to laboriously scroll up and down through a long chat history or email thread in order to find comments or information relevant to a particular context. Accordingly, the systems and methods discussed herein can help to reduce battery power and computing resources that may otherwise be exhausted in conventional manual searching approaches. In addition, the level of data retrieval by a mobile computing device can be minimized by gathering and providing as output only text data that is extracted from messages as relevant to a particular user context. Because the disclosed systems and methods do not retrieve exhaustive records of complete chat message histories, a more streamlined and efficient technical solution is possible. The disclosed systems and methods can assign extracted text to different user contexts, allowing a more timely and meaningful presentation of text data that is correlated to particular events and/or activities to be provided to a mobile computing device user.

Another example technical effect and benefit of the present disclosure is improved text extraction and/or context determination outputs by predicting relevant portions of extracted text, assigned contexts for relevant text, and/or current user contexts with increased accuracy. Accuracy levels for a context determination model can be increased due to a machine-learned context determination model's ability to consider text data from multiple users across one or more text-based applications operation on a mobile computing device, for example. Similarly, accuracy levels for a text extraction model can also be increased due to a machine-learned text extraction model's ability to learn which portions of message text are relevant to a user and should be assigned to particular contexts or categories.

Another example technical effect and benefit of the present disclosure is enhanced text extraction and/or context determination results that are customizable to specific users of one or more mobile computing devices. Outputs can be user-customized by training a machine-learned context determination model and/or a machine-learned text extraction model using training data including labeled device data obtained from a mobile computing device associated with a particular user, thus providing tailored results that are targeted towards specific text message content and/or user contexts associated with a particular user. More complex and customized nuances in text extraction determinations and/or user context determinations can thus be afforded using the disclosed machine learning techniques. When machine learned models include deep neural networks as described, such models can better model complex text extraction functions and/or user context determination functions as compared to polynomials. As such, the text extraction models and/or context determination models of the present disclosure can provide superior prediction accuracy if trained properly.

Another example technical benefit of the present disclosure is improved scalability. In particular, modeling extracted assigned text data and/or user context data through neural networks or other machine-learned models greatly reduces the research time needed relative to development of hand-crafted text extraction and/or context determination algorithms. For example, for hand-crafted text extraction algorithms, an algorithm programmer would need to exhaustively derive heuristic models of how different messages and/or portions of message text are relevant or not relevant as well as how different portions of text should be applied to different user contexts in different scenarios and/or for different users. Similarly, for hand-crafted context determination algorithms, an algorithm programmer would need to exhaustively derive heuristic models of how different sets of device data (e.g., sensor data and/or application data) should be determined as corresponding to different user contexts in different scenarios and/or for different users. By contrast, to use neural networks or other machine learning techniques as described herein, a machine-learned text extraction model and/or a machine-learned context determination model can be trained on appropriate training data, which can be done at a massive scale if the training system permits. In addition, the machine-learned models can easily be revised as new training data is made available.

With reference now to the Figures, example embodiments of the present disclosure will be discussed in further detail.

Example Devices and Systems

FIG. 1 depicts a block diagram of an example mobile computing device 102 according to example embodiments of the present disclosure. The mobile computing device 102 can be configured or operable to perform aspects of the present disclosure, including creation and/or use of a text extraction model 112 and/or context determination model 114.

The mobile computing device 102 can be a desktop computing device, a laptop computing device, a tablet computing device, a mobile computing device (e.g., a smartphone computing device), a computing device of a vehicle (e.g., an in-vehicle communications system, an in-vehicle entertainment system, an in-vehicle navigation system), or a wearable apparatus that includes a computing device (e.g., a watch having a computing device, glasses having a computing device, a virtual or augmented reality computing device). Additional and/or alternative computing devices can be provided.

The mobile computing device 102 can include one or more processors 104 and a memory 106. The one or more processors 104 can be any suitable processing device (e.g., a processor core, a microprocessor, an ASIC, a FPGA, a GPU, a controller, a microcontroller, etc.) and can be one processor or a plurality of processors that are operatively connected. The memory 106 can include one or more non-transitory computer-readable storage mediums, such as RAM, ROM, EEPROM, EPROM, flash memory devices, magnetic disks, etc., and combinations thereof. The memory 106 can store data 108 and instructions 110 which are executed by the one or more processors 104 to cause the mobile computing device 102 to perform operations.

Figure 2:
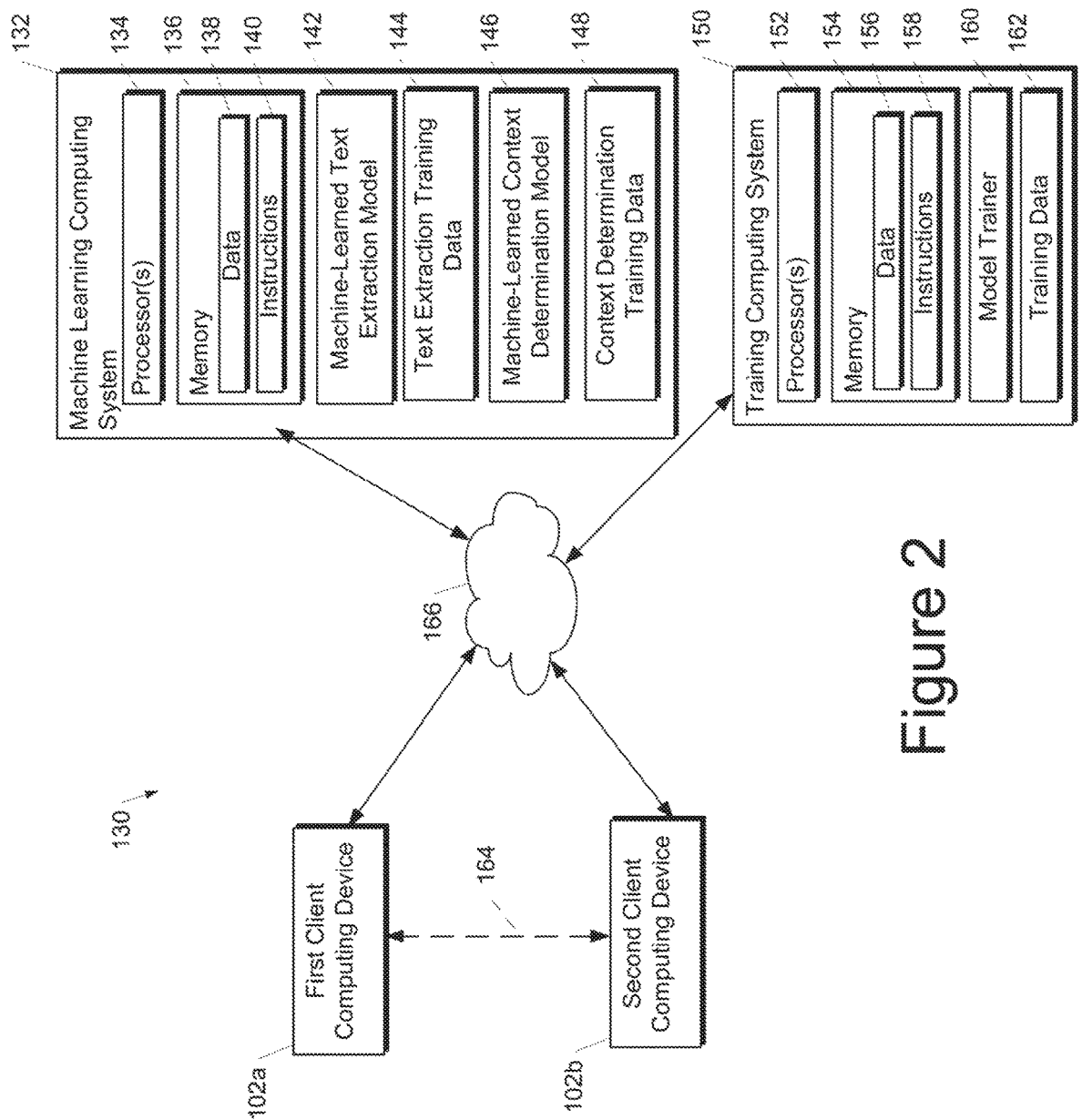
FIG. 2 depicts a block diagram of an example computing system that performs machine learning according to example embodiments of the present disclosure.
Figure 5:
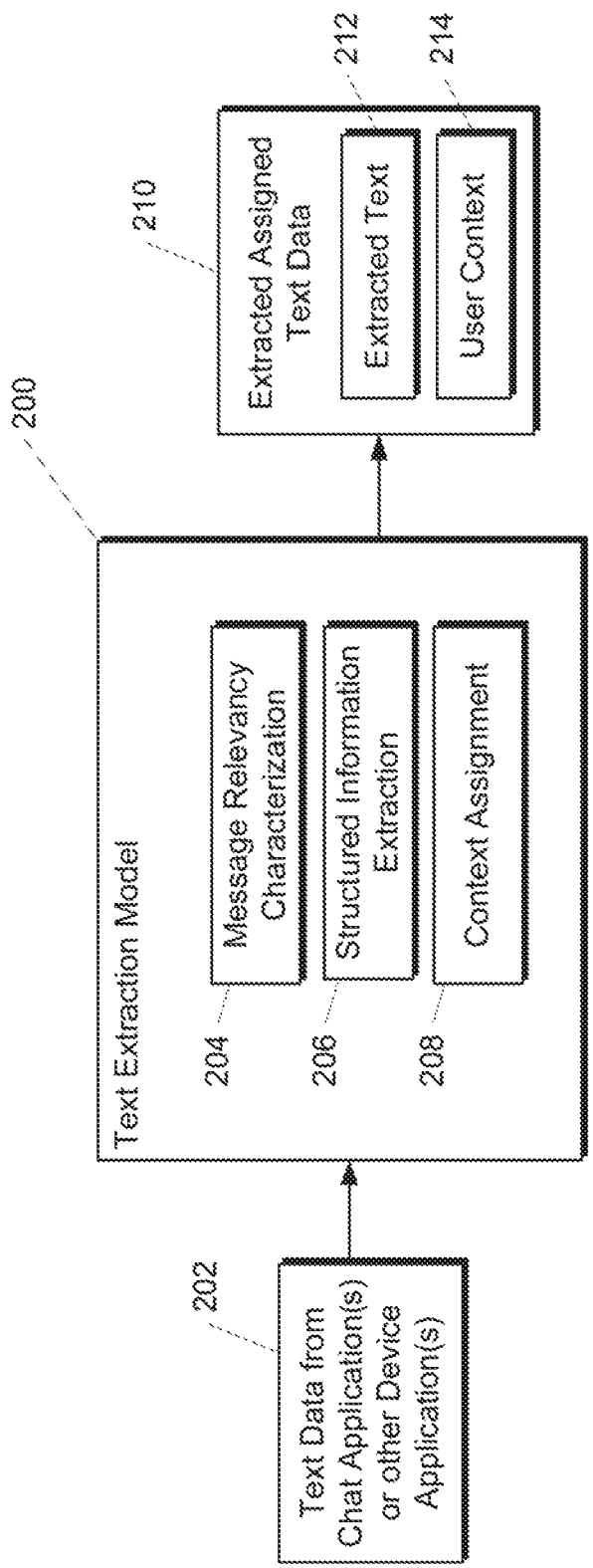
FIG. 5 depicts an example text extraction model arrangement according to example embodiments of the present disclosure.

The mobile computing device 102 can store or otherwise include a text extraction model 112. For example, the text extraction model 112 can be or can otherwise include a machine-learned text extraction model. For example, a machine-learned text extraction model can include one or more neural networks (e.g., deep neural networks), support vector machines, decision trees, ensemble models, k-nearest neighbors models, Bayesian networks, or other types of multi-layer models including linear models and/or non-linear models. Example neural networks can include feed-forward neural networks, convolutional neural networks, recurrent neural networks (e.g., long short-term memory (LSTM) recurrent neural networks, gated recurrent unit (GRU) neural networks), or other forms of neural networks. In some implementations, the mobile computing device 102 can additionally or alternatively access a text extraction model that is stored in a remote location from the mobile computing device 102 (e.g., at a remote server location hosting a text extraction application), such as depicted in FIG. 2. FIG. 5 includes some additional aspects associated with a text extraction model 112.

Figure 6:
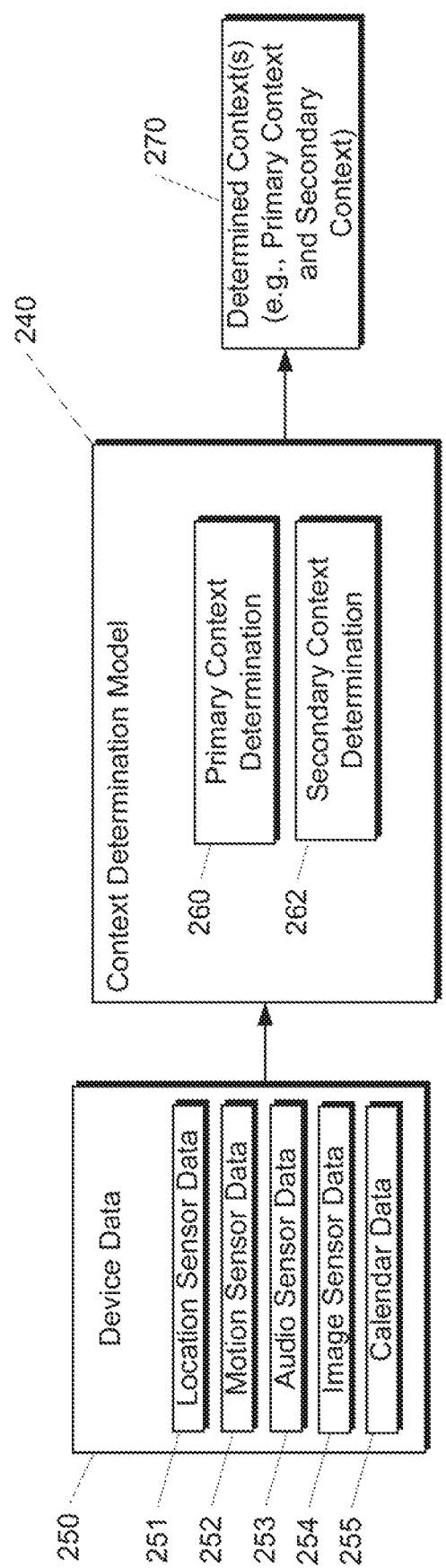
FIG. 6 depicts an example context determination model arrangement according to example embodiments of the present disclosure.

In some implementations, mobile computing device 102 can further include a context determination model 114. In some implementations, the context determination model 114 is a machine-learned context determination model. For example, a machine-learned context determination model can include one or more neural networks (e.g., deep neural networks), support vector machines, decision trees, ensemble models, k-nearest neighbors models, Bayesian networks, or other types of multi-layer models including linear models and/or non-linear models. Example neural networks can include feed-forward neural networks, convolutional neural networks, recurrent neural networks (e.g., long short-term memory (LSTM) recurrent neural networks, gated recurrent unit (GRU) neural networks), or other forms of neural networks. In some implementations, the mobile computing device 102 can additionally or alternatively access a context determination model that is stored in a remote location from the mobile computing device (e.g., at a remote server location hosting a context determination application), such as depicted in FIG. 2. FIG. 6 includes some additional aspects associated with a context determination model 114.

The mobile computing device 102 can further include a model trainer 116 that trains the text extraction model 112 using various training or learning techniques, such as, for example, backpropagation of one or more loss functions. For example, the model trainer 116 can train text extraction model 112 to receive one or more messages containing text and determine one or more portions of extracted text from the one or more messages and a corresponding user context assigned to each of the one or more portions of extracted text. The model trainer 116 can train the text extraction model 112 using a loss function that describes a difference between annotated labels associated with a set of ground-truth data and output data received from the text extraction model 112. In particular, in some implementations, such a loss function can be backpropagated through the text extraction model 112 while modifying the text extraction model 112 (e.g., by modifying at least one weight of the text extraction model 112).

Model trainer 116 can be further configured to train the context determination model 114 using various training or learning techniques, such as, for example, backpropagation of one or more loss functions. Context determination model 114 can be trained to receive one or more portions of device data from one or more input sources accessible by the mobile computing device and determine a current user context indicative of one or more activities in which a user of the mobile computing device is currently engaged. In some examples, model trainer 116 can train context determination model 114 using a loss function that describes a difference between annotated labels associated with a set of ground-truth data and output data received from the context determination model 114. In particular, in some implementations, such a loss function can be backpropagated through the context determination model 114 while modifying the context determination model 114 (e.g., by modifying at least one weight of the context determination model 114).

The model trainer 116 can include computer logic utilized to provide desired functionality. The model trainer 116 can be implemented in hardware, firmware, and/or software controlling a general purpose processor. For example, in some implementations, the model trainer 116 includes program files stored on a storage device, loaded into a memory and executed by one or more processors. In other implementations, the model trainer 116 includes one or more sets of computer-executable instructions that are stored in a tangible computer-readable storage medium such as RAM hard disk or optical or magnetic media.

The mobile computing device 102 can further include one or more input sources 120. In some implementations, the one or more input sources 120 can additionally or alternatively be available via electronic devices of a user that are networked with the mobile computing device 102 (e.g., input sources within a wearable computing device associated with a user that is in electronic communication with mobile computing device 102 also associated with the user).

Example input sources 120 can include one or more sensors, for instance, one or more location sensors 121 (e.g., a Global Positioning Sensor (GPS), wireless beacon, etc.), one or more motion sensors 122 (e.g., an accelerometer, a magnetometer, gyroscope, compass, etc.), one or more audio sensors 123 (e.g., a microphone), one or more image sensors 124 (e.g., camera), or other sensors. Example input sources 120 can also include one or more applications, for instance, calendar applications 125, chat applications 126 (e.g., text applications, messaging applications, email applications, etc.), mapping or other navigation applications, communication applications, document creation applications, and the like. As such, device data obtained from the one or more input sources 120 can include sensor-based data and/or application-based data. Sensor-based data can include raw sensor data and/or can include generalization(s) and/or classification(s) of the raw sensor data. Similarly, application-based data can include raw application data and/or can include generalization(s) and/or classification(s) of the raw application data.

In some implementations, device data obtained from input sources 120 can be stored as part of data 108 within mobile computing device 102. It should be appreciated that a user of mobile computing device 102 can be provided with an opportunity to control whether and/or which device data is obtained and accessible to text extraction model 112, context determination model 114 and/or other components of mobile computing device 102 and related applications or models.

The mobile computing device 102 can further include one or more output components 128. In some implementations, the one or more output components 128 can include a display screen 129 on which one or more portions of extracted text and/or one or more determined contexts and/or one or more user interfaces including such information or other related information can be provided for display to a user of mobile computing device 102. In some implementations, display screen 129 is configured with a touch-sensitive surface that that a user of mobile computing device 102 can interact with a graphical user interface provided on display screen 129, thus providing a component for receiving signal instructions from a user of the mobile computing device 102.

FIG. 2 depicts a block diagram of an example computing system 130 according to example embodiments of the present disclosure. The computing system 130 includes a first client computing device 102a, a second client computing device 102b, a machine learning computing system 132, and a training computing system 150 that are communicatively connected over a network 166. Although only two client computing devices 102a/102b are shown, any number of client computing devices 102a/102b can be connected to the machine learning computing system 132 and/or training computing system 150 over the network 166.

First client computing device 102a and second client computing device 102b can correspond to different instances of a mobile computing device 102 such as depicted in FIG. 1 or other computing device including a text extraction model 112 and/or context determination model 114 and/or associated components thereof as illustrated in and described with reference to FIG. 1. In some implementations, first client computing device 102a and second client computing device 102b are communicatively connected over network 166. First client computing device 102a and second client communication device 102b can be additionally or alternatively connected directly via communication channel 164.

In some examples, first client computing device 102a and second client computing device 102b are both associated with a given user and may function together to implement various aspects of the disclosed technology. For instance, first client computing device 102a can correspond to a smartphone and second client computing device can correspond to a smartwatch, both of which may be configured to gather data for input to a text extraction model 112 and/or a context determination model 114 and/or to provide output associated with such models to a user of the first client computing device 102a and/or second client computing device 102b.

In some examples, first client computing device 102a is associated with a first user, while second client computing device 102b is associated with a second user. For instance, first client computing device 102a and second client computing device 102b can both include a particular application (e.g., a chat messaging application, text messaging application, email application, voicemail application) that the first user associated with first computing device 102a and the second user associated with second computing device 102b use to communicate with one another. A message thread created using such application executed by first client computing device 102a and second client computing device 102b can be the source of one or more portions of text that are identified for extraction and display to a user when the user is operating in a particular context to which the extracted text portions are assigned.

The machine learning computing system 132 can include one or more processors 134 and a memory 136. The one or more processors 134 can be any suitable processing device (e.g., a processor core, a microprocessor, an ASIC, a FPGA, a GPU, a controller, a microcontroller, etc.) and can be one processor or a plurality of processors that are operatively connected. The memory 136 can include one or more non-transitory computer-readable storage mediums, such as RAM, ROM, EEPROM, EPROM, flash memory devices, magnetic disks, etc., and combinations thereof. The memory 136 can store data 138 and instructions 140 which are executed by the one or more processors 134 to cause the machine learning computing system 132 to perform operations.

In some implementations, the machine learning computing system 132 includes or is otherwise implemented by one or more server computing devices. In instances in which the machine learning computing system 132 includes plural server computing devices, such server computing devices can operate according to sequential computing architectures, parallel computing architectures, or some combination thereof.

The machine learning computing system 132 can store or otherwise include one or more machine-learned models, including machine-learned text extraction model 142 and/or machine-learned context determination model 146. For example, the machine-learned text extraction model 142 and/or machine-learned context determination model 146 can be or can otherwise include various machine-learned models such as neural networks (e.g., deep recurrent neural networks) or other multi-layer non-linear models, regression-based models or the like. The machine learning computing system 132 can train the machine-learned text extraction model 142 and/or machine-learned context determination model 146 via interaction with the training computing system 150 that is communicatively coupled over the network 166. The training computing system 150 can be separate from the machine learning computing system 132 or can be a portion of the machine learning computing system 132. Once the machine-learned text extraction model 142 and/or machine-learned text extraction model 146 are trained, they can be provided to or otherwise accessed by client computing device(s) 102a and/or 102b.

The training computing system 150 can include one or more processors 152 and a memory 154. The one or more processors 152 can be any suitable processing device (e.g., a processor core, a microprocessor, an ASIC, a FPGA, a GPU, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the one or more processors 152 to cause the training computing system 150 to perform operations. In some implementations, the training computing system 150 includes or is otherwise implemented by one or more server computing devices.

The training computing system 150 can include a model trainer 160 that trains the machine-learned text extraction model 142 and/or machine-learned context determination model 146 using training data 162 that can include the same training data stored at machine learning computing system 130 (e.g., text extraction training data 144 and/or context determination training data 148). The training computing system 150 can implement model training using various training or learning techniques, such as, for example, backpropagation. Adapting weights within a machine-learned model via backpropagation can then be repeated in accordance with one or more algorithms including but not limited to Gradient Descent, Stochastic Gradient Descent (SGD), Adaptive Gradient Descent (AdaGrad) and/or Adaptive Moment Estimation (ADAM) algorithms. The model trainer 160 can perform a number of generalization techniques (e.g., weight decays, dropouts, etc.) to improve the generalization capability of the models being trained.

In particular, the model trainer 160 can train machine-learned text extraction model 142 based on a set of text extraction training data 144. The text extraction training data 144 can include ground-truth data used to train machine-learned text extraction model 142 using novel loss functions. More particularly, training computing system 150 can train machine-learned text extraction model 142 using text extraction training data 144 that includes a number of sets of ground-truth data.

In some implementations, when training the machine-learned text extraction model 142 to determine relevant messages, extracted text or other structured information, and assigned user contexts, text extraction training data 144 can include structured information (e.g., messages containing text data and the like) and corresponding labels that describe a large number of previously-observed messages. In one implementation, text extraction training data 144 includes a first portion of data corresponding to recorded messages including text data relayed via a text-based application on a mobile computing device (e.g, via chat application 126 on mobile computing device 102 of FIG. 1). The recorded messages can, for example, be recorded while a user is operating one or more text-based applications (e.g., a chat messaging, text messaging, or email application) on first client computing device 102a (e.g., a mobile computing device) and/or second client computing device 102b (e.g., a wearable apparatus having a computing device). Text extraction training data 144 can further include a second portion of data corresponding to labels identifying particular portions of text or other structured data (e.g., images, videos, etc.) that should be extracted as relevant. The second portion of data within text extraction training data 144 can additionally or alternatively include labels identifying the different user contexts assigned to the relevant portions of extracted text. In some instances, the messages including text data can be labeled automatically using conventional heuristics applied to interpret the text data. For example, heuristics can include rules or patterns that are configured to detect predetermined phrases such as "I need to buy", "can you bring", "meet you at", or the like. In some instances, the messages including text data can be labeled manually. In some instances, the text data can be labeled using a combination of automatic labeling and manual labeling.

In some implementations, to train machine-learned text extraction model 142, training computing system 150 can input a first portion of a set of ground-truth data (e.g., the first portion of text extraction training data 144) into the machine-learned text extraction model 142 to be trained. In response to receipt of such first portion, the machine-learned text extraction model 142 outputs one or more portions of extracted text each with a corresponding assigned user context. This output of the machine-learned text extraction model 142 predicts the remainder of the set of ground-truth data (e.g., the second portion of text extraction training data 144). After such prediction, the training computing system 150 can apply or otherwise determine a loss function that compares the one or more portions of extracted text and corresponding assigned user context(s) output by the machine-learned text extraction model 142 to the remainder of the ground-truth data which the text extraction model attempted to predict (e.g., the second portion of text extraction training data 144). The training computing system 150 then can backpropagate the loss function through the machine-learned text extraction model 142 to train the machine-learned text extraction model 142 (e.g., by modifying one or more weights associated with the machine-learned text extraction model 142). In some implementations, machine learning tools such as TensorFlow and/or Theano can be used to perform the backpropagation of the loss function through machine-learned text extraction model 142.

Still further, model trainer 160 can train machine-learned context determination model 146 based on a set of context determination training data 148. The context determination training data 148 can include ground-truth data used to train machine-learned context determination model 146 using novel loss functions. More particularly, training computing system 150 can train machine-learned context determination model 146 using context determination training data 148 that includes a number of sets of ground-truth data.

In some implementations, when training the machine-learned context determination model 146 to determine a current user context, context determination training data 148 can include device data from one or more input sources (e.g., input sources 120 of FIG. 1) and corresponding labels that describe a large number of previously-observed instances of device data. In one implementation, machine-learned context determination training data 148 includes a first portion of data corresponding to device data from one or more input sources. The device data can include, for example, sensor-based data from one or more location sensors 121, motion sensors 122, audio sensors 123, image sensors 124 and/or other sensors and/or application-based data from one or more calendar applications 125, chat applications 126 (e.g., text applications, messaging applications, email applications, etc.), mapping or navigation applications, communication applications, document creation applications, and/or other applications. The device data can, for example, be recorded while a user is operating first client computing device 102a (e.g., a mobile computing device) and/or second client computing device 102b (e.g., a wearable apparatus having a computing device). The context determination training data 148 can further include a second portion of data corresponding to labels identifying different activities in which a particular user participates over a period of time (e.g., multiple times throughout a day, multiple days throughout a week/month/etc.) In some instances, the labels included within the second portion of data within context determination training data 148 can be manually annotated by a user of a given mobile computing device while operating a training application on the mobile computing device designed to gather labels for including in context determination training data 148. In some instances, the device data including user context labels can be labeled automatically or using a combination of automatic labeling and manual labeling.

In some implementations, to train the machine-learned context determination model 146, training computing system 150 can input a first portion of a set of ground-truth data (e.g., the first portion of context determination training data) into the machine-learned context determination model 146 to be trained. In response to receipt of such first portion, the machine-learned context determination model 146 outputs a user context indicative of one or more activities in which a user of the mobile computing device is currently engaged. This output of the machine-learned context determination model 146 predicts the remainder of the set of ground-truth data (e.g., the second portion of context determination training data 148). After such prediction, the training computing system 150 can apply or otherwise determine a loss function that compares the user context output by the machine-learned context determination model 146 to the remainder of the ground-truth data which the context determination model attempted to predict (e.g., the second portion of context determination training data 148). The training computing system 150 then can backpropagate the loss function through the machine-learned context determination model 146 to train the machine-learned context determination model 146 (e.g., by modifying one or more weights associated with the machine-learned context determination model 146). In some implementations, machine learning tools such as TensorFlow and/or Theano can be used to perform the backpropagation of the loss function through machine-learned context determination model 146.

In some implementations, if the user has provided consent, the text extraction training data 144 and/or the context determination training data 148 can be provided by the client computing devices 102a and/or 102b (e.g., based on extracted text and/or determined contexts identified by the client computing device(s) 102a and/or 102b). Thus, in such implementations, the machine-learned text extraction model 142 and/or machine-learned context determination model 146 provided to the client computing devices 102a/102b can be trained by the training computing system 150 on user-specific data received from the client computing device(s) 102a/102b. In some instances, this process can be referred to as personalizing the model.

According to another aspect of the present disclosure, in some implementations, a user feedback system can be utilized to help gather additional training data (e.g., text extraction training data 144 and/or context determination training data 148) for training machine-learned text extraction model 142 and/or machine-learned context determination model 146. For instance, a mobile computing device (e.g., mobile computing device 102 of FIG. 1) can be configured to provide for display on a display screen 129 associated with the mobile computing device 102 one or more user interfaces that prompt a user to provide signal instructions descriptive of feedback regarding a determined user context and/or one or more portions of extracted text assigned to a determined user context. An example user interface is depicted, for example, in FIG. 10. The signal instructions from the user can be provided along with data describing the determined user context and/or one or more portions of extracted text assigned to a determined user context as training data for one or more of the machine-learned text extraction model 142 and the machine-learned context determination model 146.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 166 can be any type of communications network, such as a local area network (e.g., intranet), wide area network (e.g., Internet), or some combination thereof and can include any number of wired or wireless links. In general, communication over the network 166 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 2 illustrates one example computing system 130 that can be used to implement the present disclosure. Other computing systems can be used as well. For example, in some implementations, the client computing device(s) 102a/102b can include the model trainer 160 and the training data 162. In such implementations, the text extraction model(s) and/or context determination model(s) can be both trained and used locally at the client computing device.

Figure 3:
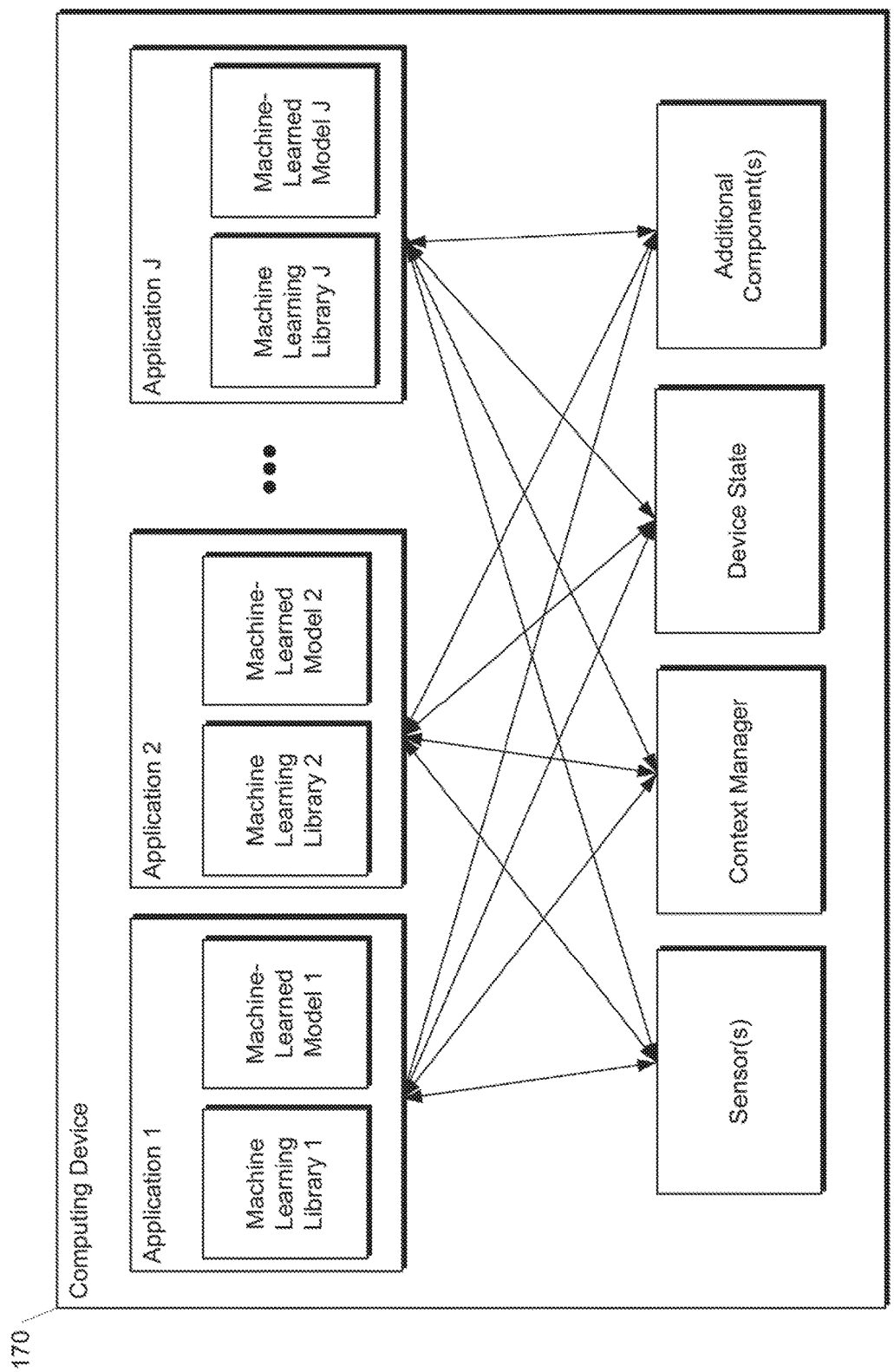
FIG. 3 depicts a block diagram of a first example computing device that performs machine learning according to example embodiments of the present disclosure.

FIG. 3 depicts a block diagram of an example computing device 170 that performs communication assistance according to example embodiments of the present disclosure. The computing device 170 can be a user computing device or a server computing device.

The computing device 170 includes a number of applications (e.g., applications 1 through J). Each application contains its own machine learning library and machine-learned model(s). For example, each application can include a machine-learned communication assistance model. Example applications include a text messaging application, an email application, a dictation application, a virtual keyboard application, a browser application, a virtual reality (VR) application, etc.

As illustrated in FIG. 3, each application can communicate with a number of other components of the computing device, such as, for example, one or more sensors, a context manager, a device state component, and/or additional components. In some implementations, each application can communicate with each device component using an API (e.g., a public API). In some implementations, the API used by each application can be specific to that application.

Figure 4:
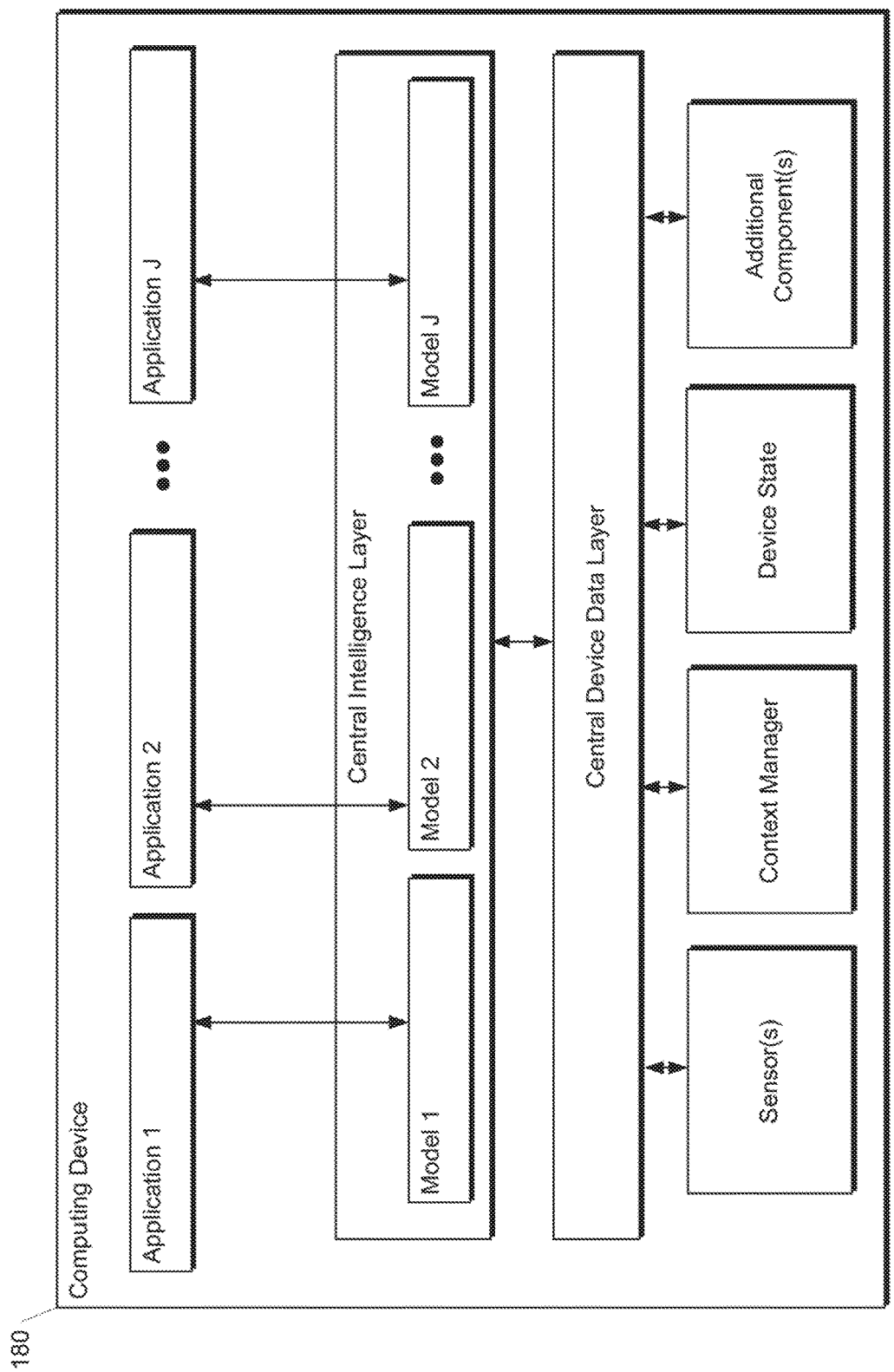
FIG. 4 depicts a block diagram of a second example computing device that performs machine learning according to example embodiments of the present disclosure.

FIG. 4 depicts a block diagram of an example computing device 180 that performs communication assistance according to example embodiments of the present disclosure. The computing device 180 can be a user computing device or a server computing device.

The computing device 180 includes a number of applications (e.g., applications 1 through J). Each application can be in communication with a central intelligence layer. Example applications include a text messaging application, an email application, a dictation application, a virtual keyboard application, a browser application, a virtual reality (VR) application, etc. In some implementations, each application can communicate with the central intelligence layer (and model(s) stored therein) using an API (e.g., a common API across all applications).

The central intelligence layer includes a number of machine-learned models. For example, as illustrated in FIG. 4, a respective machine-learned model (e.g., a communication assistance model) can be provided for each application and managed by the central intelligence layer. In other implementations, two or more applications can share a single machine-learned model. For example, in some implementations, the central intelligence layer can provide a single model (e.g., a single communication assistance model) for all of the applications. In some implementations, the central intelligence layer can be included within or otherwise implemented by an operating system of the computing device 180.

The central intelligence layer can communicate with a central device data layer. The central device data layer can be a centralized repository of data for the computing device 180. As illustrated in FIG. 4, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

FIG. 5 depicts an example text extraction model arrangement according to example embodiments of the present disclosure. More particularly, text extraction model 200 of FIG. 5 can correspond to text extraction model 112 of FIG. 1, machine-learned text extraction model 142 of FIG. 2, or other text extraction model embodiments in accordance with the subject disclosure.

Text extraction model 200 can be a machine-learned model. In some implementations, text extraction model 200 can be or can otherwise include various machine-learned models such as neural networks (e.g., deep recurrent neural networks) or other multi-layer non-linear models, regression-based models or the like. When text extraction model 200 includes a recurrent neural network, this can be a multi-layer long short-term memory (LSTM) neural network, a multi-layer gated recurrent unit (GRU) neural network, or other form of recurrent neural network.

The text extraction model 200 can be configured to receive text data 202. In one example, text data 202 can be obtained from one or more computing device applications (e.g., one or more of a text messaging application, a chat messaging application, an email application, and/or a voicemail application). As such, text data 202 can sometimes include messages or message threads communicated via such computing device applications, wherein the messages and/or message threads respectively include text data 202. In some implementations, text data 202 can be obtained and further analyzed on a continuous basis such that text data 202 is obtained in real time or near real time and analyzed upon being sent and/or received within a text-based application. In some implementations, text data 202 can be iteratively updated, refreshed, or generated as additional text data is sent and/or received. In some implementations, the text data 202 can be obtained and further analyzed on a periodic basis such as at regularly scheduled intervals (e.g., every five minutes). In some implementations, the text data 202 can be obtained and further analyzed upon the occurrence of one or more triggering events (e.g., times when a particular text-based application is opened or employed on a mobile computing device, times when a new context is determined by the mobile computing device, etc.) A user of the mobile computing device can be provided with an opportunity to control whether and/or which messages and/or text data 202 is accessible to a text extraction model 200 and/or other components of the mobile computing device and related applications or models.

Referring still to FIG. 5, the text data 202 can be provided as input into the text extraction model 200. In some implementations, the machine-learned text extraction model 200 can include a neural network and inputting the text data 202 includes inputting the text data into the neural network of the machine-learned text extraction model 200. In some implementations, machine-learned text extraction model 200 can include many different sizes, numbers of layers and levels of connectedness. For neural networks trained by large datasets, the number of layers and layer size can be increased by using dropout to address the potential problem of overfitting. In some instances, a neural network can be designed to forego the use of fully connected upper layers at the top of the network. By forcing the network to go through dimensionality reduction in middle layers, a neural network model can be designed that is quite deep, while dramatically reducing the number of learned parameters. In some implementations, machine-learned text extraction model 200 can include a neural network with word embeddings, which map a word or phrase provided as input to text extraction model 200 to one or more vectors of real numbers. Text extraction model 200 can be additionally configured using one or more techniques including but not limited to batch normalization, layer normalization, gradient clipping, attention mechanisms, adding REctified Linear UnitS (RELUS), leaky RELUS, etc.

In some implementations, text extraction model 200 can include one or more message relevancy characterization layers 204, one or more structured information extraction layers 206, and/or one or more context assignment layers 208. Although message relevancy characterization layers 204, structured information extraction layers 206, and/or context assignment layers 208 are depicted as separate layers in text extraction model 200, it should be appreciated that such layers can be shared layers such that message relevancy, structured information extraction, and context assignment can be jointly and simultaneously learned and determined by text extraction model 200. When text data 202 includes a message thread or plurality of messages from a computing device application, message relevancy characterization layers 204 can determine which messages in the message thread or plurality of messages are relevant for further analysis by structured information extraction layers 206 and/or context assignment layers 208. Structured information extraction layers 206 can determine which portions of structured information (e.g., text, etc.) within relevant messages or all messages received by text extraction model 200 to extract. Context assignment layers 208 can determine a particular context to assign to each portion of structured information extracted by structured information extraction layers 206. As such, an output of text extraction model 200 can correspond to extracted assigned text data 210. Extracted assigned text data 210 can include one or more portions of extracted text 212 that are selectively extracted from text data 202 as well as a corresponding user context 214 assigned to each of the one or more portions of extracted text 212.

Referring still to FIG. 5, in some implementations, the user context 214 assigned to each of the one or more portions of extracted text 212 can be determined from a predetermined set of different user contexts. Each user context 214 can be indicative of a different activity in which a user of a mobile computing device may be engaged. As such, the predetermined set of user contexts can include respective contexts for one or more different activities including shopping or attending an event. In some implementations, the predetermined set of user contexts can include one or more primary contexts and one or more secondary contexts. For example, the one or more primary contexts could correspond to the different activities (e.g., shopping or attending an event), and the one or more secondary contexts could correspond to particular aspects of the different activities.

For instance, a secondary context could describe a category associated with the activity. One example user context could have a primary context of shopping and a secondary context associated with the categorical type of shopping (e.g., furniture shopping, grocery shopping, clothing shopping, etc.) Another example user context could have a primary context of attending an event with a secondary context associated with the categorical type of event (e.g., attending a work meeting, attending a social event with friends, attending a fitness class at the gym, etc.)

FIG. 6 depicts an example context determination model arrangement according to example embodiments of the present disclosure. More particularly, context determination model 240 of FIG. 6 can correspond to context determination model 114 of FIG. 1, machine-learned context determination model 146 of FIG. 2, or other context determination model embodiments in accordance with the subject disclosure.

Context determination model 240 can be a machine-learned model. In some implementations, context determination model 240 can be or can otherwise include various machine-learned models such as neural networks (e.g., deep recurrent neural networks) or other multi-layer non-linear models, regression-based models or the like. When context determination model 240 includes a recurrent neural network, this can be a multi-layer long short-term memory (LSTM) neural network, a multi-layer gated recurrent unit (GRU) neural network, or other form of recurrent neural network.

The context determination model 240 can be configured to receive device data 250 from one or more computing devices (e.g., mobile computing device 102 of FIG. 1, first client computing device 102a of FIG. 2 and/or second client computing device 102b of FIG. 2). Device data 250 can include, for example, sensor-based data and/or application-based data. In some implementations, device data 250 can include one or more of location sensor data 251 (e.g., such as obtained from a location sensor 121 of FIG. 1), motion sensor data 252 (e.g., such as obtained from a motion sensor 122 of FIG. 1), audio sensor data 253 (e.g., such as obtained from audio sensor 123 of FIG. 1), image sensor data 254 (e.g., such as obtained from image sensor 124 of FIG. 1), and/or calendar data 255 (e.g., such as obtained from calendar application 125 of FIG. 1). In some implementations, device data 250 can be obtained and further analyzed on a continuous basis such that device data 250 is obtained in real time or near real time and analyzed upon being sent and/or received within a text-based application. In some implementations, device data 250 can be iteratively updated, refreshed, or generated. In some implementations, the device data 250 can be obtained and further analyzed on a periodic basis such as at regularly scheduled intervals (e.g., every five minutes). In some implementations, the device data 250 can be obtained and further analyzed upon the occurrence of one or more triggering events (e.g., times when a computing device changes locations, captures new audio or image data, determines the occurrence of a calendared event, etc.) A user of a mobile computing device can be provided with an opportunity to control whether and/or which device data 250 is accessible to a context determination model 240 and/or other components of the mobile computing device and related applications or models.

Referring still to FIG. 6, the device data 250 can be provided as input into the machine-learned context determination model 240. In some implementations, the machine-learned context determination model 240 can include a neural network and inputting the device data 250 includes inputting the device data into the neural network of the machine-learned context determination model 240. In some implementations, machine-learned context determination model 240 can include many different sizes, numbers of layers and levels of connectedness. For neural networks trained by large datasets, the number of layers and layer size can be increased by using dropout to address the potential problem of overfitting. In some instances, a neural network can be designed to forego the use of fully connected upper layers at the top of the network. By forcing the network to go through dimensionality reduction in middle layers, a neural network model can be designed that is quite deep, while dramatically reducing the number of learned parameters.

In some implementations, context determination model 240 can include one or more primary context determination layers 260 and/or secondary context determination layers 262. Additional levels of context determination layers (e.g., tertiary context determination layers, etc.) can also be included although not illustrated in FIG. 6. Although primary context determination layers 260 and/or secondary context determination layers 262 are depicted as separate layers in context determination model 240, it should be appreciated that such layers can be shared layers such that primary context determination and secondary context determination (as well as any other levels of context determination) can be jointly and simultaneously learned and determined by context determination model 240. An output of context determination model 240 can correspond to one or more determined current contexts 270. Each determined current context can include one or more layers of context, for example a primary context (e.g., shopping) and a secondary context (e.g., groceries, furniture, clothing, etc.)

Referring still to FIG. 6, in some implementations, the current context(s) 270 determined by context determination model 240 can be determined from a predetermined set of different user contexts. In some implementations, the predetermined set of different user contexts from which current context(s) 270 is determined corresponds to the same predetermined set of different user contexts 214 that can be assigned to extracted text by text extraction model 200. Each user context can be indicative of a different activity in which a user of a mobile computing device may be engaged. As such, the predetermined set of user contexts can include respective contexts for one or more different activities including shopping or attending an event. In some implementations, the predetermined set of user contexts can include one or more primary contexts and one or more secondary contexts. For example, the one or more primary contexts could correspond to the different activities (e.g., shopping or attending an event), and the one or more secondary contexts could correspond to particular aspects of the different activities. For instance, a secondary context could describe a category associated with the activity. One example user context could have a primary context of shopping and a secondary context associated with the categorical type of shopping (e.g., furniture shopping, grocery shopping, clothing shopping, etc.) Another example user context could have a primary context of attending an event with a secondary context associated with the categorical type of event (e.g., attending a work meeting, attending a social event with friends, attending a fitness class at the gym, etc.)

Example User Interfaces

Figure 7:
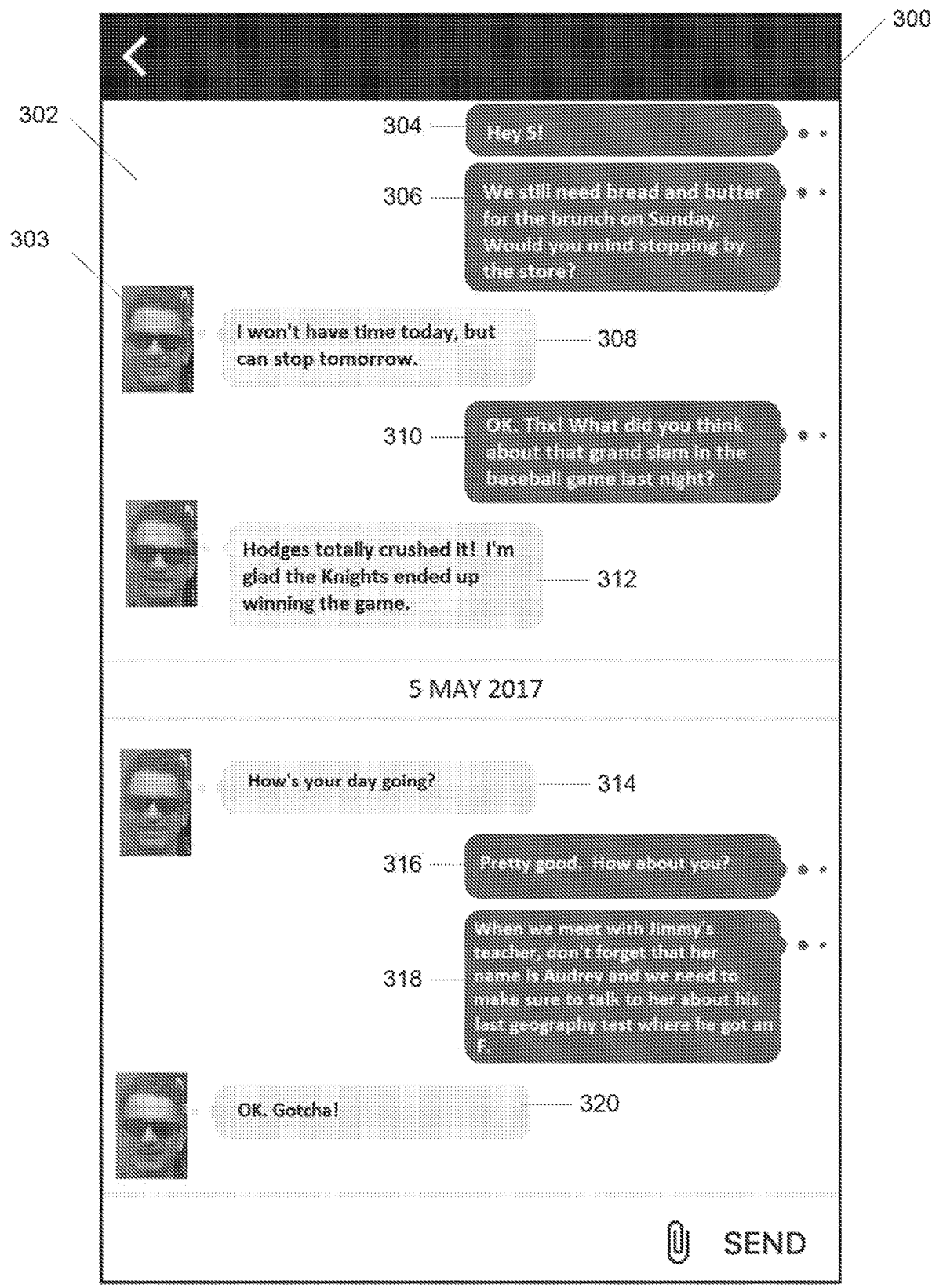
FIG. 7 depicts an example user interface associated with a chat messaging application according to example embodiments of the present disclosure.

FIGS. 7 and 8 provide example aspects related to a text extraction model 200 such as depicted in FIG. 5.

FIG. 7 depicts an example user interface associated with a chat messaging application according to example embodiments of the present disclosure. More particularly, user interface 300 depicts an example message thread 302 that is communicated between two or more parties. In particular, message thread 302 is communicated between a first user of a mobile computing device and a second user depicted by second user profile image 303. Message thread 302 includes a plurality of messages 304-320. Some or all of the messages 304-320 can be provided as input to a text extraction model in accordance with the disclosed technology. For instance, messages 304-320 can correspond to text data 202 provided as input to text extraction model 200 of FIG. 5.

FIG. 8 depicts an example database record for extracted assigned text according to example embodiments of the present disclosure. More particularly, FIG. 8 depicts an extracted assigned text database 330 that includes data associated with messages provided as input to a text extraction model as well as information determined from the text extraction model for such messages. Extracted assigned text database records can be configured to store information received as output from a text extraction model. For instance, extracted assigned text database 330 can be configured to store extracted assigned text data 210 such as depicted in FIG. 5 when messages 304-320 of FIG. 7 are provided as input (e.g., text data 202) to text extraction model 200. Extracted assigned text database 330 includes, for example, a plurality of data records 332-344 corresponding to the one or more portions of extracted text 212 from messages 304-320. Each data record 332-344 can include, for example, a portion of extracted text, one or more identifiers associated with the extracted text (e.g., a message identifier, a date identifier, a time identifier, a sender identifier, one or more recipient identifiers), and one or more assigned contexts. Assigned user contexts can include multiple user contexts when available (e.g., a primary user context, secondary user context, tertiary user context, etc.) or other descriptors or categories associated with a user context. For example, first data record 332 of FIG. 8 corresponds to extracted assigned text from message 306 in FIG. 7. Data record 332 includes a portion of extracted text (e.g., "Bread"), one or more identifiers including message identifier "ABC306", date identifier "May 4, 2017", time identifier "2:32 pm" and one or more assigned contexts (e.g., primary context "shopping" and secondary context "groceries").

FIG. 9 depicts an example user interface configured to display information descriptive of a determined user context according to example embodiments of the present disclosure. More particularly, FIG. 9 depicts an example user interface 400 shown, for example, on a display screen of a mobile computing device 402. In some implementations, mobile computing device 402 can correspond to mobile computing device 102 of FIG. 1 including display screen 129. User interface 400 includes a context display portion 404 and a plurality of selectable user interface buttons 406-412, respectively. Context display portion 404 within user interface 400 can be configured to display a current user context, for example, as determined by a context determination model according to example embodiments of the present disclosure. In some implementations, user interface 400 or one or more portions thereof can be continuously provided for display as an output on mobile computing device 402. In some implementations, user interface 400 or one or more portions thereof can be provided for display upon occurrence of one or more triggering events (e.g., when a new current user context is determined by a context determination model as described herein).

Referring still to FIG. 9, user interaction with the user interface (e.g., by selecting one or more user interface buttons 406, 408, 410 and/or 412 can initiate the relay of signal instructions descriptive of feedback regarding the determined user context. For example, feedback received from user selection of user interface button 406 can confirm the current context determined and displayed in context display portion 404 if such current context is correct. Feedback received from user selection of user interface button 408 can modify a determined user context if the user context determined and displayed in context display portion 404 is incorrect. For example, selection of user interface button 408 can initiate the display of a list of selectable alternative contexts. Feedback received from user selection of user interface button 410 can initiate the display of settings pertaining to device data accessed by mobile computing device 402 and/or factors for determining current user contexts by a context determination model and/or display settings associated with user interface 400. The feedback received from user selection of user interface buttons 406, 408, 410 or others can then be used to generate a label for including with the corresponding device data used to determine the user context indicated within context display portion 404. The labeled data can then be added to context determination training data 148 of FIG. 2 or other training dataset for training a context determination model.

In some implementations, user interface 400 of FIG. 9 can additionally include user interface button 412, which initiates the display of relevant text data that has been assigned to the current user context determined and displayed in context display portion 404. Continuing with the example of FIGS. 7 and 8, if the context display portion 404 indicates that a context determination model has determined the current user context to have a primary context of shopping and a secondary context of grocery shopping, context display portion 404 can include text descriptive of the determined current user context (e.g., "You are at the grocery store.") Selection of user interface button 412 can then initiate the display of extracted text that is assigned to the particular grocery shopping context (e.g., "Bread, Butter, For May 10, 2017"). The source of such extracted text (e.g., "From chat with User B") can additionally or alternatively be provided for display along with the extracted text. Such extracted text can be provided in a display window 414 that is provided within a separate user interface to user interface 400, within a window that is overlaid upon user interface 400, or in any other suitable display configuration.

Figure 10:
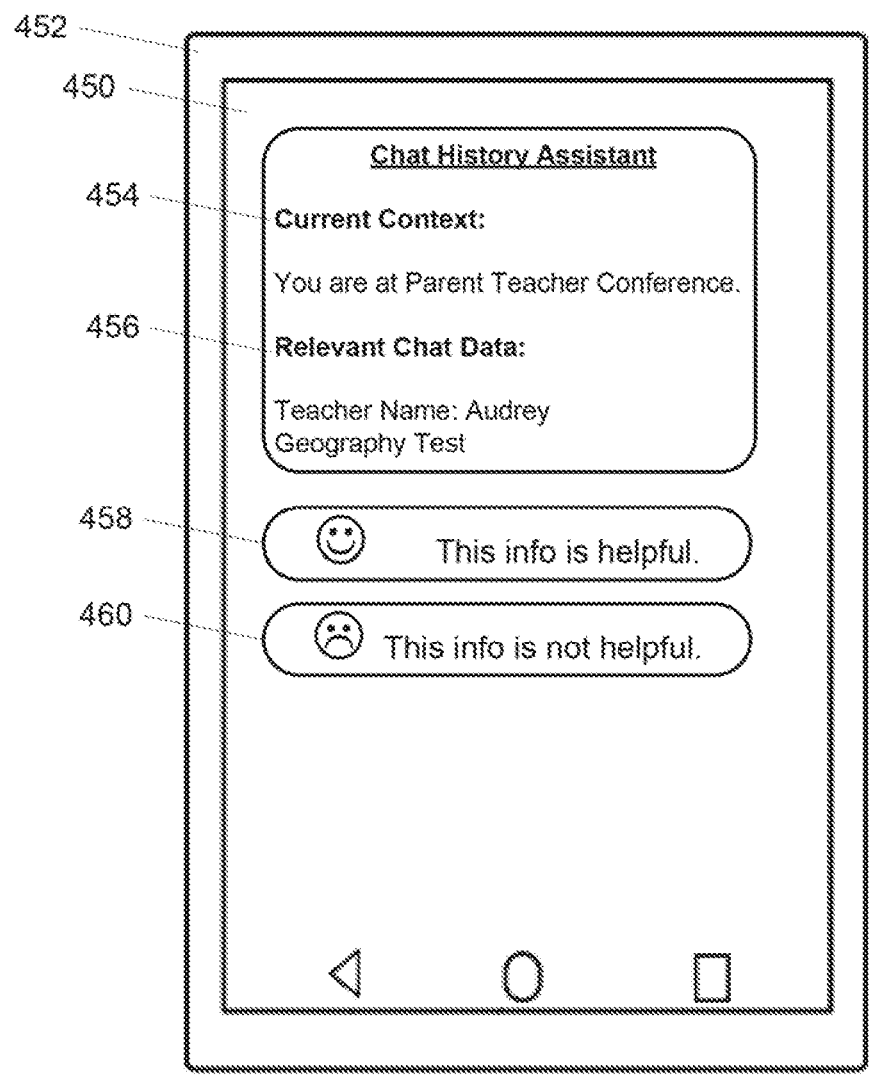
FIG. 10 depicts an example user interface associated with extracted text according to example embodiments of the present disclosure.

FIG. 10 depicts an example user interface associated with extracted text according to example embodiments of the present disclosure. More particularly, FIG. 10 depicts an example user interface 450 shown, for example, on a display screen of a mobile computing device 452. In some implementations, mobile computing device 452 can correspond to computing device 102 of FIG. 1 including display screen 129. User interface 450 includes a current context display portion 454, a relevant chat data display portion 456 and selectable user interface buttons 458 and 460. User interface 450 provides a notification including extracted assigned text data (e.g., provided within relevant chat data display portion 456) that can be actively provided as output based on a determined current user context (e.g., provided within current context display portion 454). For instance, mobile computing device 452 can be configured to automatically determine a current user context indicative of one or more activities in which a user of the mobile computing device is currently engaged, which upon determination is displayed within current context display portion 454. A machine-learned context determination model as described herein can be used to determine the current user context displayed within current context display portion 454. A machine-learned text extraction model can also be used simultaneously with a context determination model to identify portions of extracted text from chat messages that can be assigned to particular user contexts. At least one portion of extracted text assigned to the current user context determined and displayed within current context display portion 454 can thus be provided as output within the relevant chat data display portion 456 of user interface 450. Continuing with example data from FIGS. 7 and 8, user interface 450 of FIG. 10 identifies a "Parent Teacher Conference Meeting" as the current context in current context display portion 454 and "Teacher Name: Audrey; Geography Test" as extracted portions of text having an assigned user context that matches "Parent Teacher Conference Meeting."

Referring still to FIG. 10, user interaction with the user interface (e.g., by selecting one or more user interface buttons 458 and/or 460 can initiate the relay of signal instructions descriptive of feedback regarding the extracted assigned text. For example, the feedback can indicate that the extracted assigned text was helpful upon user selection of user interface button 458 or that the extracted assigned text was not helpful upon user selection of user interface element 460. Options can be included to provide feedback for portions of extracted text or to provide a score for the level of helpfulness. This feedback can then be used to generate one or more labels for including with the corresponding text data. The labeled data can then be added to text extraction training data 144 of FIG. 2 or other training dataset for training a text extraction model.

Example Methods

FIGS. 11-14, respectively, set forth aspects associated with one or more computer-implemented methods according to example embodiments of the present disclosure. In some embodiments, the computer-implemented methods of FIGS. 11-14 can include other features or steps disclosed herein. In some embodiments, a computing device, computing system, or other example system or device as described with reference to FIGS. 1 and 2 or other example systems or devices can implement some or all of the methods depicted in FIGS. 11-14. In some embodiments, one or more tangible, non-transitory computer-readable media storing computer-readable instructions that when executed by one or more processors cause the one or more processors to perform operations, the operations comprising steps as set forth in one or more of the methods depicted in FIGS. 11-14.

Figure 11:
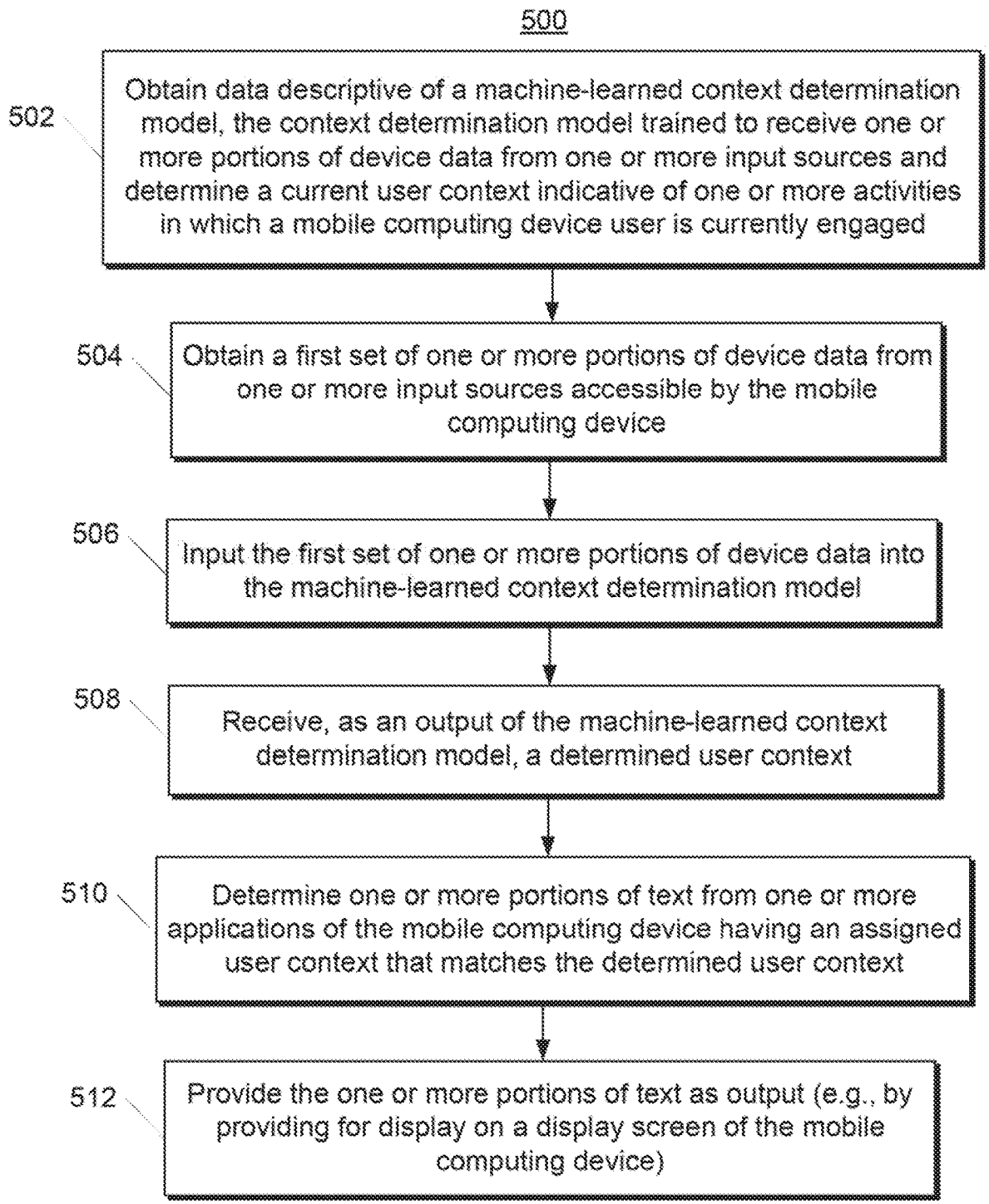
FIG. 11 depicts a flow chart diagram of a first example method to perform machine learning for context determination according to example embodiments of the present disclosure.

FIG. 11 depicts a flow chart diagram of a first example method 500 to perform machine learning according to example embodiments of the present disclosure. Some aspects of method 500 are similarly depicted and described with reference to FIG. 6.

At 502, one or more computing devices can obtain data descriptive of a machine-learned context determination model (e.g., context determination model 114 of FIG. 1, machine-learned context determination model 146 of FIG. 2, and/or context determination model 240 of FIG. 6). The context determination model for which data is obtained at 502 can have been trained to receive one or more portions of device data from one or more input sources and determine a current user context indicative of one or more activities in which a mobile computing device user is currently engaged.

At 504, one or more computing devices can obtain a first set of one or more portions of device data from one or more input sources accessible by the mobile computing device. Device data obtained at 504 can correspond, for example, to device data 250 of FIG. 6 or data obtained from one or more input sources 120 (e.g., sensors and/or applications) of FIG. 1. For example, in some implementations, a computing device can include one or more input sources configured to provide the device data, the input sources comprising one or more of a location sensor, a motion sensor, an audio sensor, an image sensor, and a calendar application.

At 506, one or more computing devices can input the first set of one or more portions of device data obtained at 504 into the machine-learned context determination model for which data is obtained at 502.

At 508, one or more computing devices can receive, as an output of the machine-learned context determination model, a determined user context. In some implementations, the determined user context received at 508 can be determined from a predetermined set of user contexts, each user context indicative of a different activity in which a user of the mobile computing device may be engaged. For example, the predetermined set of user contexts can include respective contexts for one or more different activities including shopping or attending an event. In some implementations, each different activity associated with a user context in the predetermined set of user contexts corresponds to a primary context. The user context can be further determined to include a secondary context associated with a category describing a particular aspect of the activity.

At 510, one or more computing devices can determine one or more portions of text from one or more applications (e.g., one or more of a text messaging application, a chat messaging application, an email application, and a voicemail application) of the mobile computing device having an assigned user context that matches the determined user context. In some implementations, determining one or more portions of text at 510 is determined periodically. In some implementations, the one or more portions of text are taken from a message thread between two or more parties as communicated using a networked application on respective user computing devices.

In some implementations, determining one or more portions of text from one or more applications of the mobile computing device having an assigned user context that matches the determined user context can include use of a machine-learned text extraction model. For instance, one or more computing devices can input the text from the one or more applications into a machine-learned text extraction model. The machine-learned text extraction model can have been trained to receive one or more messages containing text and to determine one or more portions of extracted text from the one or more messages and a corresponding user context assigned to each of the one or more portions of extracted text. The one or more computing devices can receive, as an output of the machine-learned text extraction model, one or more portions of extracted text, wherein the user context assigned to each of the one or more portions of extracted text corresponds to the determined user context.

At 512, one or more computing devices can provide the one or more portions of text as output (e.g., by providing for display on a display screen of a computing device).

In some implementations, method 500 can include additional steps. For example, method 500 can additionally include receiving signal instructions from a user descriptive of feedback regarding the one or more portions of text provided for display on the display screen of the mobile computing device. The signal instructions from the user can be provided in conjunction with data describing the one or more portions of text provided for display on the display screen as training data for the machine-learned context determination model for which data is obtained at 502. Such training data may be saved as part of training data 118 of FIG. 1, context determination training data 148 of FIG. 2 and/or training data 162 of FIG. 2.

Figure 12:
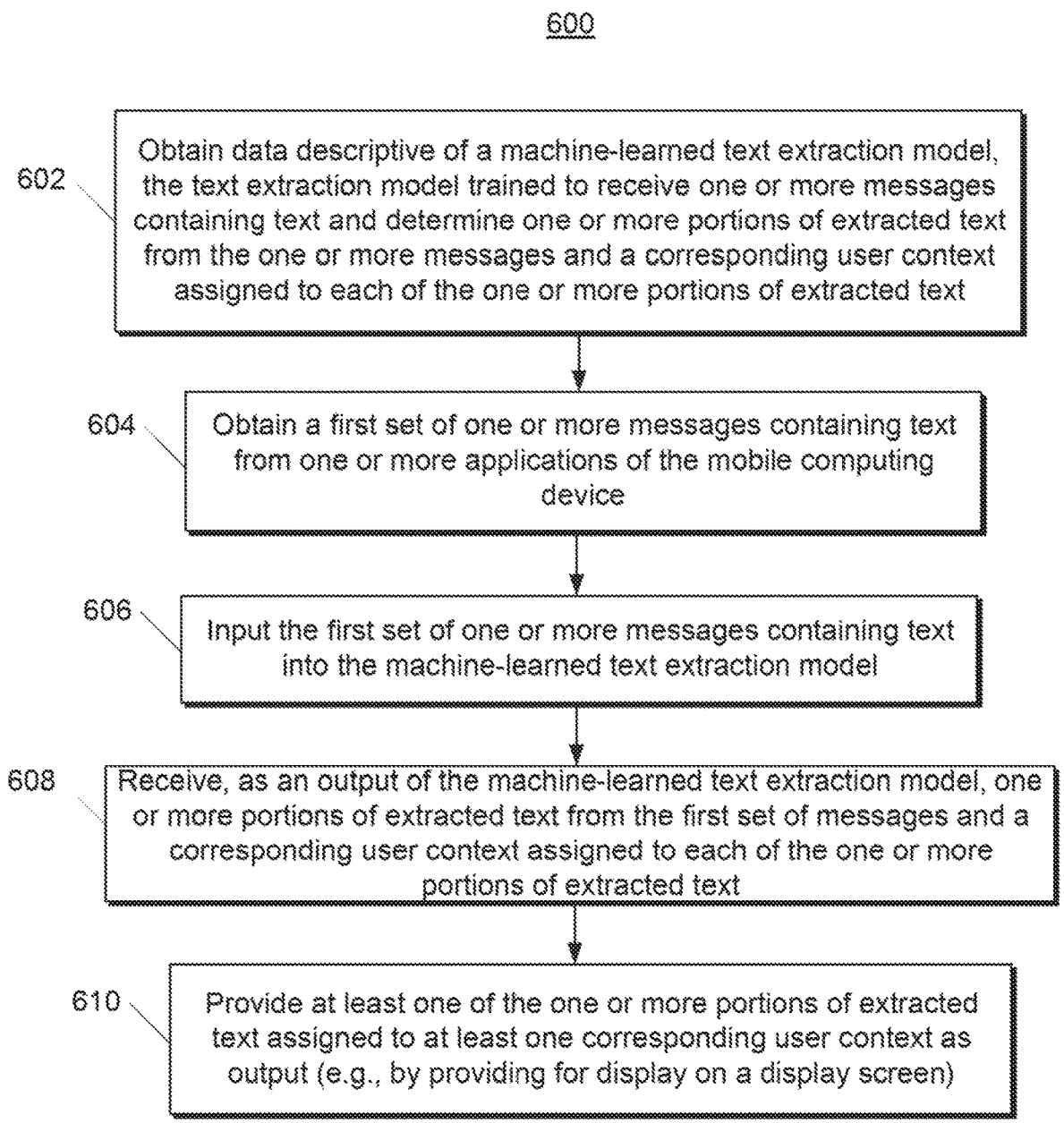
FIG. 12 depicts a flow chart diagram of a second example method to perform machine learning for text extraction according to example embodiments of the present disclosure.

FIG. 12 depicts a flow chart diagram of a second example method 600 to perform machine learning according to example embodiments of the present disclosure. Some aspects of method 600 are similarly depicted and described with reference to FIG. 5.

At 602, one or more computing devices can obtain data descriptive of a machine-learned text extraction model (e.g., text extraction model 112 of FIG. 1, machine-learned text extraction model 142 of FIG. 2, and/or text extraction model 200 of FIG. 5). The text extraction model for which data is obtained at 602 can have been trained to receive one or more messages containing text and determine one or more portions of extracted text from the one or more messages and a corresponding user context assigned to each of the one or more portions of extracted text.

At 604, one or more computing devices can obtain a first set of one or more messages containing text from one or more applications of a mobile computing device (e.g., chat application 126 of mobile computing device 102 of FIG. 1 or another text messaging application, a chat messaging application, an email application, or a voicemail application).

At 606, one or more computing devices can input the first set of one or more messages containing text into the machine-learned text extraction model for which data is obtained at 602.

At 608, one or more computing devices can receive, as an output of the machine-learned text extraction model, one or more portions of extracted text from the first set of messages and a corresponding user context assigned to each of the one or more portions of extracted text.

In some implementations, the obtaining at 604, inputting at 606 and receiving at 608 are implemented periodically or upon the occurrence of one or more triggering events.

At 610, one or more computing devices can provide at least one of the one or more portions of extracted text assigned to at least one corresponding user context as output (e.g., by providing for display on a display screen).

In some implementations, method 600 can include additional steps. For example, method 600 can include receiving signal instructions from a user indicative of a particular user context. In some implementations, method 600 can include determining a current user context indicative of one or more activities in which a user of the mobile computing device is currently engaged. In such implementations, providing at least one portion of extracted text assigned to at least one corresponding user category as output at 610 can include providing at least one portion of extracted text corresponding to the current user context as output (e.g., by providing for display on a display screen).

In some implementations, determining a current user context can more particularly include obtaining a first set of one or more portions of device data from one or more input sources (e.g., a location sensor, a motion sensor, an audio sensor, an image sensor, and/or a calendar application) accessible by the mobile computing device. The first set of one or more portions of device data can be provided as input into a machine-learned context determination model that can have been trained to receive one or more portions of device data from the one or more input sources and determine a current user context indicative of one or more activities in which a user of the mobile computing device is currently engaged. A determined current user context can be received as an output of the machine-learned context determination model.

In some implementations, a current user context can be determined from a predetermined set of user contexts. Each user context can be indicative of a different activity in which a user of a mobile computing device may be engaged, and optionally wherein the predetermined set of user contexts comprises respective contexts for one or more different activities including shopping or attending an event. In some implementations, each different activity associated with a user context in the predetermined set of user contexts corresponds to a primary context, and the user context can be further determined to include a secondary context associated with a category describing a particular aspect of the activity.

In some implementations, method 600 can additionally include receiving signal instructions from a user descriptive of feedback regarding the at least one portion of extracted text provided as output at 610. The signal instructions from the user can then be provided in conjunction with data describing the at least one portion of text provided as output as training data for the machine-learned text extraction model for which data is obtained at 602. Such training data may be saved as part of training data 118 of FIG. 1, text extraction training data 144 of FIG. 2 and/or training data 162 of FIG. 2.

Figure 13:
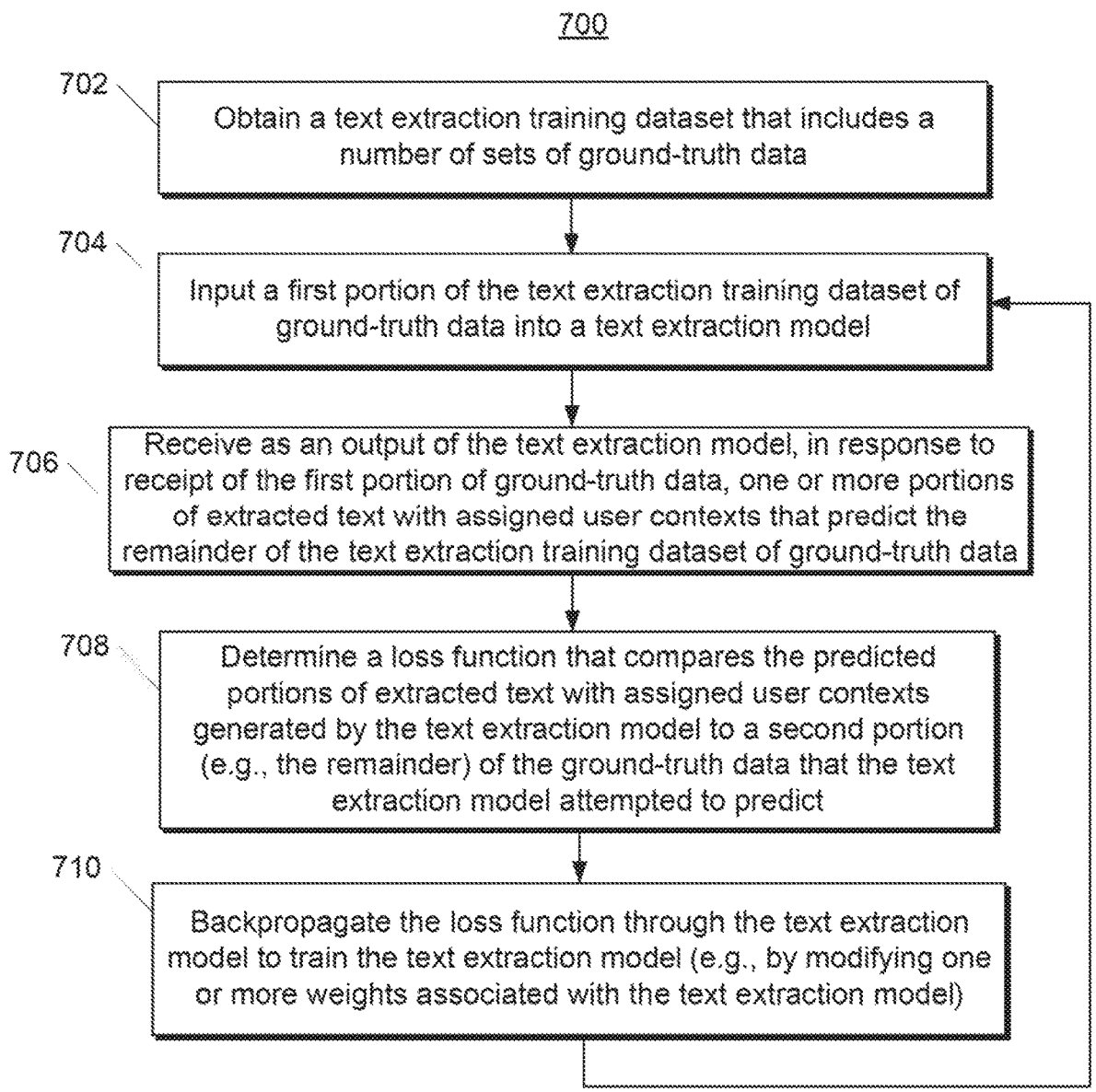
FIG. 13 depicts a flow chart diagram of an example method to train a machine-learned text extraction model according to example embodiments of the present disclosure.

FIG. 13 depicts a flow chart diagram of an example method to train a machine-learned text extraction model according to example embodiments of the present disclosure. More particularly, method 700 includes aspects associated with training a text extraction model. Some aspects of method 700 are similarly depicted and described with reference to FIG. 2.

At 702, one or more computing devices can obtain a text extraction training dataset (e.g., text extraction training data 144 of FIG. 2 and/or a portion of training data 118 of FIG. 1 and/or a portion of training data 162 of FIG. 2) that includes a number of sets of ground-truth data. At 704, one or more computing devices can provide a first portion of the text extraction training dataset of ground-truth data obtained at 704 as input into a text extraction model. At 706, one or more computing devices can receive as an output of the text extraction model, in response to receipt of the first portion of ground-truth data, one or more portions of extracted text with assigned user contexts that predict the remainder of the text extraction training dataset of ground-truth data. At 708, one or more computing devices can determine a loss function that compares the predicted portions of extracted text with assigned user contexts generated by the text extraction model to a second portion (e.g., the remainder) of the ground-truth data that the text extraction model attempted to predict. At 710, one or more computing devices can backpropagate the loss function through the text extraction model to train the text extraction model (e.g., by modifying one or more weights associated with the text extraction model). The steps depicted at 704-710 respectively can be repeated numerous times as part of training the text extraction model in method 700.

Figure 14:
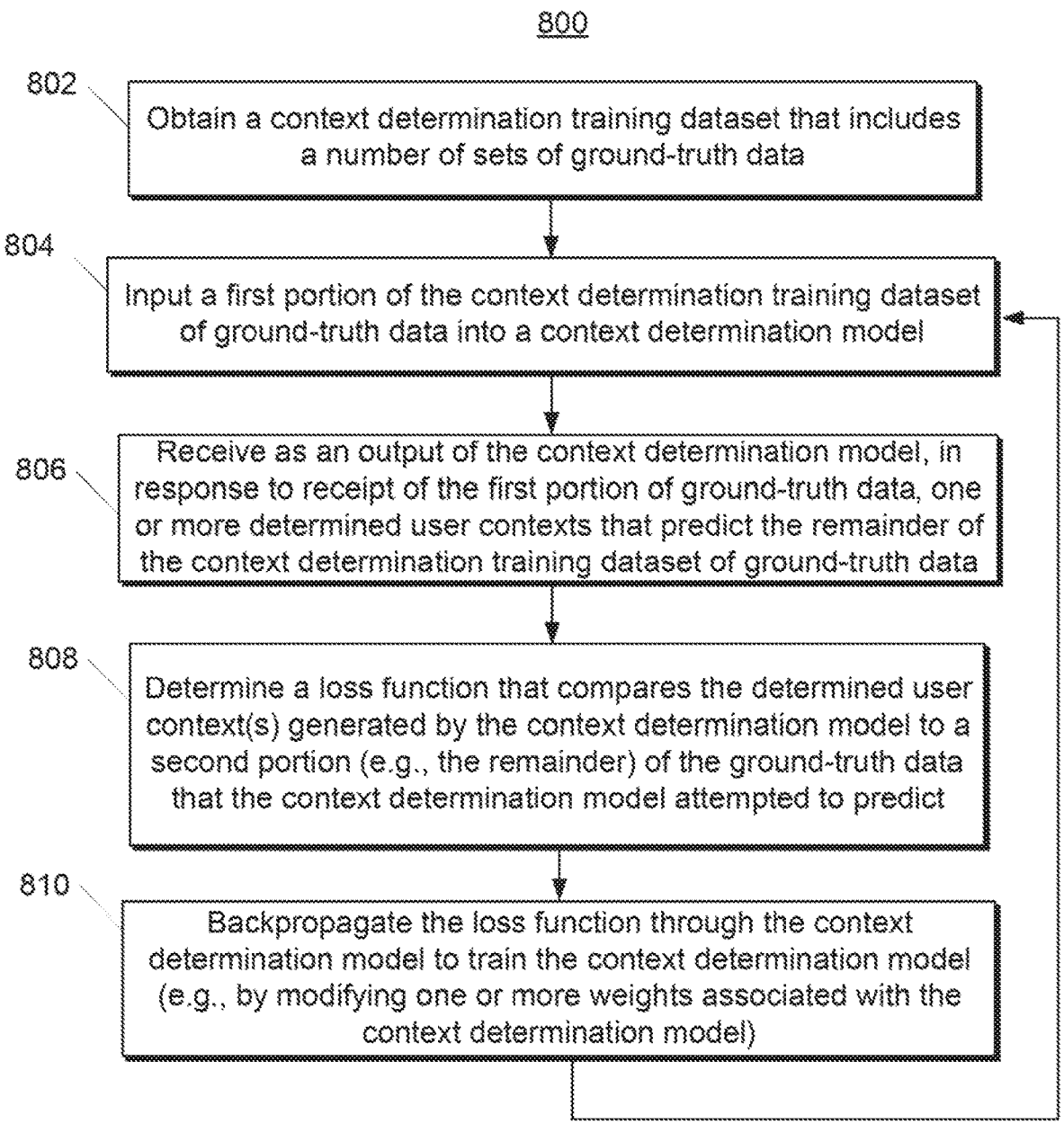
FIG. 14 depicts a flow chart diagram of an example method to train a machine-learned context determination model according to example embodiments of the present disclosure.

FIG. 14 depicts a flow chart diagram of an example method to train a machine-learned context determination model according to example embodiments of the present disclosure. More particularly, method 800 includes aspects associated with training a context determination model. Some aspects of method 800 are similarly depicted and described with reference to FIG. 2.

At 802, one or more computing devices can obtain a context determination training dataset (e.g., context determination training data 148 of FIG. 2 and/or a portion of training data 118 of FIG. 1 and/or a portion of training data 162 of FIG. 2) that includes a number of sets of ground-truth data. At 804, one or more computing devices can provide a first portion of the context determination training dataset of ground-truth data obtained at 704 as input into a context determination model. At 806, one or more computing devices can receive as an output of the context determination model, in response to receipt of the first portion of ground-truth data, one or more determined user contexts that predict the remainder of the context determination training dataset of ground-truth data. At 808, one or more computing devices can determine a loss function that compares the determined user context(s) generated by the context determination model to a second portion (e.g., the remainder) of the ground-truth data that the context determination model attempted to predict. At 810, one or more computing devices can backpropagate the loss function through the context determination model to train the context determination model (e.g., by modifying one or more weights associated with the context determination model). The steps depicted at 804-810 respectively, can be repeated numerous times as part of training the context determination model in method 800.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 11-14 respectively depict steps performed in a particular order for purposes of illustration and discussion, the methods of the present disclosure are not limited to the particularly illustrated order or arrangement. The various steps of the methods 500, 600, 700, and 800 can be omitted, rearranged, combined, and/or adapted in various ways without deviating from the scope of the present disclosure.

What is claimed is:

1. A mobile computing device, comprising:
   at least one processor;
   a display screen;
   a machine-learned context determination model, wherein the context determination model has been trained to receive one or more portions of device data from one or more input sources accessible by the mobile computing device and determine a current user context indicative of one or more activities in which a user of the mobile computing device is currently engaged;
   at least one tangible, non-transitory computer-readable medium that stores instructions that, when executed by the at least one processor, cause the mobile computing device to perform operations, the operations comprising:
   obtaining a first set of one or more portions of device data from one or more input sources accessible by the mobile computing device;
   inputting the first set of one or more portions of device data into the machine-learned context determination model;
   receiving, as an output of the machine-learned context determination model, a determined user context;
   determining one or more portions of text from one or more applications of the mobile computing device that have an assigned user context that matches the determined user context; and
   providing the one or more portions of text for display on the display screen of the mobile computing device.

2. The mobile computing device of claim 1, wherein the determined user context is determined from a predetermined set of user contexts, each user context indicative of a different activity in which a user of the mobile computing device may be engaged.

3. The mobile computing device of claim 2, wherein the predetermined set of user contexts comprises respective contexts for one or more different activities including shopping or attending an event.

4. The mobile computing device of claim 2, wherein each different activity associated with a user context in the predetermined set of user contexts corresponds to a primary context and wherein the user context is further determined to include a secondary context associated with a category describing a particular aspect of the activity.

5. The mobile computing device of claim 1, further comprising one or more input sources configured to provide the device data, the input sources comprising one or more of a location sensor, a motion sensor, an audio sensor, an image sensor, and a calendar application.

6. The mobile computing device of claim 1, wherein determining one or more portions of text from one or more applications of the mobile computing device that have an assigned user context that matches the determined user context is determined periodically.

7. The mobile computing device of claim 1, wherein the one or more applications of the user computing device comprise one or more of a text messaging application, a chat messaging application, an email application, and a voicemail application.

8. The mobile computing device of claim 7, wherein the one or more portions of text are taken from a message thread between two or more parties.

9. The mobile computing device of claim 1, the operations further comprising:
   receiving signal instructions from a user descriptive of feedback regarding the one or more portions of text provided for display on the display screen of the mobile computing device; and
   providing the signal instructions from the user in conjunction with data describing the one or more portions of text provided for display on the display screen as training data for the machine-learned context determination model.

10. The mobile computing device of claim 1, wherein the step of determining the one or more portions of text from the one or more applications of the mobile computing device that have an assigned user context that matches the determined user context comprises:
    inputting the text from the one or more applications into a machine-learned text extraction model, the machine-learned text extraction model having been trained to receive one or more messages containing text and to determine one or more portions of extracted text from the one or more messages and a corresponding user context assigned to each of the one or more portions of extracted text; and
    receiving, as an output of the machine-learned text extraction model, one or more portions of extracted text, wherein the user context assigned to each of the one or more portions of extracted text corresponds to the determined current user context.

11. A mobile computing device, comprising:
    at least one processor;
    a machine-learned text extraction model, wherein the text extraction model has been trained to receive one or more messages containing text and determine one or more portions of extracted text from the one or more messages and a corresponding user context assigned to each of the one or more portions of extracted text;
    at least one tangible, non-transitory computer-readable medium that stores instructions that, when executed by the at least one processor, cause the mobile computing device to perform operations, the operations comprising:

obtaining a first set of messages containing text from one or more applications of the mobile computing device;

inputting the first set of messages containing text into the machine-learned text extraction model;

receiving, as an output of the machine-learned text extraction model, one or more portions of extracted text from the first set of messages and a corresponding user context assigned to each of the one or more portions of extracted text; and providing at least one portion of extracted text assigned to at least one corresponding user context as output.

12. The mobile computing device of claim 11, wherein the operations further comprise receiving signal instructions from a user indicative of a particular user context, and wherein providing at least one portion of extracted text assigned to at least one corresponding user context as output comprises providing at least one portion of extracted text assigned to the particular user context for display on a display screen of the mobile computing device.

13. The mobile computing device of claim 11, wherein the operations further comprise determining a current user context indicative of one or more activities in which a user of the mobile computing device is currently engaged, and wherein providing at least one portion of extracted text assigned to at least one corresponding user category as output comprises providing at least one portion of extracted text corresponding to the current user context for display on a display screen.

14. The mobile computing device of claim 13, wherein determining the current user context comprises:

obtaining a first set of one or more portions of device data from one or more input sources accessible by the mobile computing device;

inputting the first set of one or more portions of device data into a machine-learned context determination model, wherein the context determination model has been trained to receive one or more portions of device data from the one or more input sources and determine a current user context indicative of one or more activities in which a user of the mobile computing device is currently engaged; and receiving, as an output of the machine-learned context determination model, a determined current user context.

15. The mobile computing device of claim 13, wherein the current user context is determined from a predetermined set of user contexts, each user context indicative of a different activity in which a user of the mobile computing device may be engaged, and optionally wherein the predetermined set of user contexts comprises respective contexts for one or more different activities including shopping or attending an event.

16. The mobile computing device of claim 15, wherein each different activity associated with a user context in the predetermined set of user contexts corresponds to a primary context and wherein the user context is further determined to include a secondary context associated with a category describing a particular aspect of the activity.

17. The mobile computing device of claim 13, further comprising one or more input sources configured to provide device data, the input sources comprising one or more of a location sensor, a motion sensor, an audio sensor, an image sensor, and a calendar application, and wherein the device data is employed at least in part to determine the current user context.

18. The mobile computing device of claim 11, wherein the obtaining, inputting and receiving operations are implemented periodically.

19. The mobile computing device of claim 11, wherein the one or more applications of the user computing device comprise one or more of a text messaging application, a chat messaging application, an email application, and a voicemail application.

20. The mobile computing device of claim 11, the operations further comprising:

receiving signal instructions from a user descriptive of feedback regarding the at least one portion of extracted text provided as output; and providing the signal instructions from the user in conjunction with data describing the at least one portion of text provided as output as training data for the machine-learned text extraction model.

21. One or more tangible, non-transitory computer-readable media storing computer-readable instructions that when executed by one or more processors cause the one or more processors to perform operations, the operations comprising:

obtaining a first set of messages containing text from one or more applications of a mobile computing device;

inputting the first set of messages containing text into a machine-learned text extraction model, wherein the text extraction model has been trained to receive one or more messages containing text and determine one or more portions of extracted text from the one or more messages and a corresponding user context assigned to each of the one or more portions of extracted text;

receiving, as an output of the machine-learned text extraction model, one or more portions of extracted text from the first set of messages and a corresponding user context assigned to each of the one or more portions of extracted text; and providing at least one portion of extracted text assigned to at least one corresponding user context as output.

22. The one or more tangible, non-transitory computer-readable media storing computer-readable instructions of claim 21, wherein providing at least one portion of extracted text assigned to the at least one corresponding user context as output comprises providing the at least one portion of extracted text for display.

23. The one or more tangible, non-transitory computer-readable media storing computer-readable instructions of claim 21, wherein the instructions further comprise:

receiving signal instructions descriptive of feedback regarding the at least one portion of extracted text provided as output; and providing the signal instructions from the user in conjunction with data describing the at least one portion of extracted text provided as output as training data for the machine-learned text extraction model.

24. One or more tangible, non-transitory computer-readable media storing computer executable instructions that when executed by one or more processors cause the processors to perform operations, the operations comprising:

obtaining a first set of one or more portions of device data from one or more input sources accessible by a mobile computing device;

inputting the first set of one or more portions of device data into a machine-learned context determination model, wherein the context determination model has been trained to receive one or more portions of device data from the one or more input sources and determine a current user context indicative of one or more activities in which a user of the mobile computing device is currently engaged;

receiving, as an output of the machine-learned context determination model, a determined current user context;

determining one or more portions of text from one or more applications of the mobile computing device that are relevant to the determined user context; and providing the one or more portions of text for display on a display screen of the mobile computing device.

25. The one or more tangible, non-transitory computer-readable media storing computer-readable instructions of claim 24, wherein determining one or more portions of text from one or more applications of the mobile computing device that are relevant to the determined user context comprises:

inputting the text from the one or more applications into a machine-learned text extraction model, the machine-learned text extraction model being trained to receive one or more messages containing text and to determine one or more portions of extracted text from the one or more messages and a corresponding user context assigned to each of the one or more portions of extracted text; and receiving, as an output of the machine-learned text extraction model, one or more portions of extracted text, wherein the user context assigned to each of the one or more portions of extracted text corresponds to the determined current user context.

26. The one or more tangible, non-transitory computer-readable media storing computer-readable instructions of claim 24, wherein the instructions further comprise:

receiving signal instructions descriptive of feedback regarding the one or more portions of text provided for display on the display screen of the mobile computing device; and providing the signal instructions from the user in conjunction with data describing the one or more portions of text provided for display on the display screen as training data for the machine-learned context determination model.

* * * * *